United States Patent
Betser et al.

(10) Patent No.: US 7,605,579 B2
(45) Date of Patent: Oct. 20, 2009

(54) MEASURING AND CONTROLLING CURRENT CONSUMPTION AND OUTPUT CURRENT OF CHARGE PUMPS

(75) Inventors: Yoram Betser, Mazkeret Batya (IL); Alexander Kushnarenko, Haifa (IL); Oleg Dadashev, Hadera (IL)

(73) Assignee: Saifun Semiconductors Ltd., Netanya (IL)

( * ) Notice: Subject to any disclaimer, the term of this patent is extended or adjusted under 35 U.S.C. 154(b) by 0 days.

(21) Appl. No.: 11/602,222

(22) Filed: Nov. 21, 2006

(65) Prior Publication Data

US 2008/0094127 A1    Apr. 24, 2008

Related U.S. Application Data

(60) Provisional application No. 60/845,272, filed on Sep. 18, 2006.

(51) Int. Cl.
   G01R 19/00    (2006.01)
   G01R 29/00    (2006.01)
   G05F 1/10     (2006.01)
(52) U.S. Cl. .................. 324/76.11; 324/76.79; 327/536
(58) Field of Classification Search .................. 324/100, 324/99 R, 98, 522, 76.11, 158.1, 76.79; 327/148, 327/157, 536, 537; 257/299; 375/374; 331/1 A, 331/1 R
See application file for complete search history.

(56) References Cited

U.S. PATENT DOCUMENTS

| | | |
|---|---|---|
| 3,881,180 A | 4/1975 | Gosney, Jr. |
| 3,895,360 A | 7/1975 | Cricchi et al. |
| 3,952,325 A | 4/1976 | Beale et al. |
| 4,016,588 A | 4/1977 | Ohya et al. |
| 4,017,888 A | 4/1977 | Christie et al. |
| 4,145,703 A | 3/1979 | Blanchard et al. |
| 4,151,021 A | 4/1979 | McElroy |
| 4,173,766 A | 11/1979 | Hayes |
| 4,173,791 A | 11/1979 | Bell |
| 4,247,861 A | 1/1981 | Hsu et al. |
| 4,257,832 A | 3/1981 | Schwabe et al. |
| 4,281,397 A | 7/1981 | Neal et al. |
| 4,306,353 A | 12/1981 | Jacobs et al. |
| 4,342,102 A | 7/1982 | Puar |
| 4,342,149 A | 8/1982 | Jacobs et al. |
| 4,360,900 A | 11/1982 | Bate |
| 4,373,248 A | 2/1983 | McElroy |

(Continued)

FOREIGN PATENT DOCUMENTS

EP    0 656 628    6/1995

(Continued)

OTHER PUBLICATIONS

U.S. Appl. No. 08/902,890, filed Jul. 30, 1997, Eitan.

(Continued)

*Primary Examiner*—Diego Gutierrez
*Assistant Examiner*—Hoai-An D Nguyen
(74) *Attorney, Agent, or Firm*—EMPK & Shiloh, LLP

(57) ABSTRACT

The present invention is a method and apparatus for regulating current consumption and output current of a charge pump. According to some embodiments of the present invention, a first current coming into the charge pump and a second current coming into a driver of at least one of one or more stages of the charge pump is measured. A control loop may regulate one or more parameters of the charge pump and/or a load connected to the charge pump, such as by adjusting one or more of: a supply voltage; a stage's voltage; the stage's frequency and/or duty-cycle; and the number of stages.

20 Claims, 3 Drawing Sheets

U.S. PATENT DOCUMENTS

| | | |
|---|---|---|
| 4,380,057 A | 4/1983 | Kotecha et al. |
| 4,388,705 A | 6/1983 | Sheppard |
| 4,389,705 A | 6/1983 | Sheppard |
| 4,404,747 A | 9/1983 | Collins |
| 4,435,786 A | 3/1984 | Tickle |
| 4,448,400 A | 5/1984 | Harari |
| 4,471,373 A | 9/1984 | Shimizu et al. |
| 4,494,016 A | 1/1985 | Ransom et al. |
| 4,507,673 A | 3/1985 | Aoyama |
| 4,521,796 A | 6/1985 | Rajkanan et al. |
| 4,527,257 A | 7/1985 | Cricchi |
| 4,586,163 A | 4/1986 | Koike |
| 4,613,956 A | 9/1986 | Paterson et al. |
| 4,630,085 A | 12/1986 | Koyama |
| 4,663,645 A | 5/1987 | Komori et al. |
| 4,665,426 A | 5/1987 | Allen et al. |
| 4,667,217 A | 5/1987 | Janning |
| 4,672,409 A | 6/1987 | Takei et al. |
| 4,725,984 A | 2/1988 | Ip et al. |
| 4,733,105 A | 3/1988 | Shin et al. |
| 4,742,491 A | 5/1988 | Liang et al. |
| 4,758,869 A | 7/1988 | Eitan et al. |
| 4,760,555 A | 7/1988 | Gelsomini et al. |
| 4,761,764 A | 8/1988 | Watanabe |
| 4,769,340 A | 9/1988 | Chang et al. |
| 4,780,424 A | 10/1988 | Holler et al. |
| 4,839,705 A | 6/1989 | Tigelaar et al. |
| 4,847,808 A | 7/1989 | Kobatake |
| 4,857,770 A | 8/1989 | Partovi et al. |
| 4,870,470 A | 9/1989 | Bass, Jr. et al. |
| 4,888,735 A | 12/1989 | Lee et al. |
| 4,916,671 A | 4/1990 | Ichiguchi |
| 4,941,028 A | 7/1990 | Chen et al. |
| 4,961,010 A | 10/1990 | Davis |
| 4,992,391 A | 2/1991 | Wang |
| 5,021,999 A | 6/1991 | Kohda et al. |
| 5,027,321 A | 6/1991 | Park |
| 5,029,063 A | 7/1991 | Lingstaedt et al. |
| 5,042,009 A | 8/1991 | Kazerounian et al. |
| 5,075,245 A | 12/1991 | Woo et al. |
| 5,081,371 A | 1/1992 | Wong |
| 5,086,325 A | 2/1992 | Schumann et al. |
| 5,094,968 A | 3/1992 | Schumann et al. |
| 5,104,819 A | 4/1992 | Freiberger et al. |
| 5,117,389 A | 5/1992 | Yiu |
| 5,120,672 A | 6/1992 | Mitchell et al. |
| 5,142,495 A | 8/1992 | Canepa |
| 5,142,496 A | 8/1992 | Van Buskirk |
| 5,159,570 A | 10/1992 | Mitchell et al. |
| 5,168,334 A | 12/1992 | Mitchell et al. |
| 5,172,338 A | 12/1992 | Mehrotra et al. |
| 5,175,120 A | 12/1992 | Lee |
| 5,204,835 A | 4/1993 | Eitan |
| 5,214,303 A | 5/1993 | Aoki |
| 5,237,213 A | 8/1993 | Tanoi |
| 5,241,497 A | 8/1993 | Komarek |
| 5,260,593 A | 11/1993 | Lee |
| 5,268,861 A | 12/1993 | Hotta |
| 5,276,646 A | 1/1994 | Kim et al. |
| 5,280,420 A | 1/1994 | Rapp |
| 5,289,412 A | 2/1994 | Frary et al. |
| 5,293,563 A | 3/1994 | Ohta |
| 5,295,092 A | 3/1994 | Hotta et al. |
| 5,295,108 A | 3/1994 | Higa |
| 5,305,262 A | 4/1994 | Yoneda |
| 5,311,049 A | 5/1994 | Tsuruta |
| 5,315,541 A | 5/1994 | Harari et al. |
| 5,324,675 A | 6/1994 | Hayabuchi |
| 5,334,555 A | 8/1994 | Sugiyama et al. |
| 5,335,198 A | 8/1994 | Van Buskirk et al. |
| 5,338,954 A | 8/1994 | Shimoji |
| 5,345,425 A | 9/1994 | Shikatani |
| 5,349,221 A | 9/1994 | Shimoji |
| 5,350,710 A | 9/1994 | Hong et al. |
| 5,352,620 A | 10/1994 | Komori et al. |
| 5,357,134 A | 10/1994 | Shimoji |
| 5,359,554 A | 10/1994 | Odake et al. |
| 5,361,343 A | 11/1994 | Kosonocky et al. |
| 5,366,915 A | 11/1994 | Kodama |
| 5,369,615 A | 11/1994 | Harari et al. |
| 5,375,094 A | 12/1994 | Naruke |
| 5,381,374 A | 1/1995 | Shiraishi et al. |
| 5,393,701 A | 2/1995 | Ko et al. |
| 5,394,355 A | 2/1995 | Uramoto et al. |
| 5,399,891 A | 3/1995 | Yiu et al. |
| 5,400,286 A | 3/1995 | Chu et al. |
| 5,402,374 A | 3/1995 | Tsuruta et al. |
| 5,412,601 A | 5/1995 | Sawada et al. |
| 5,414,693 A | 5/1995 | Ma et al. |
| 5,418,176 A | 5/1995 | Yang et al. |
| 5,418,743 A | 5/1995 | Tomioka et al. |
| 5,422,844 A | 6/1995 | Wolstenholme et al. |
| 5,424,567 A | 6/1995 | Chen |
| 5,424,978 A | 6/1995 | Wada et al. |
| 5,426,605 A | 6/1995 | Van Berkel et al. |
| 5,428,621 A | 6/1995 | Mehrotra et al. |
| 5,434,825 A | 7/1995 | Harari et al. |
| 5,436,478 A | 7/1995 | Bergemont et al. |
| 5,436,481 A | 7/1995 | Egawa et al. |
| 5,440,505 A | 8/1995 | Fazio et al. |
| 5,450,341 A | 9/1995 | Sawada et al. |
| 5,450,354 A | 9/1995 | Sawada et al. |
| 5,455,793 A | 10/1995 | Amin et al. |
| 5,467,308 A | 11/1995 | Chang et al. |
| 5,477,499 A | 12/1995 | Van Buskirk et al. |
| 5,495,440 A | 2/1996 | Asakura |
| 5,496,753 A | 3/1996 | Sakurai et al. |
| 5,508,968 A | 4/1996 | Collins et al. |
| 5,518,942 A | 5/1996 | Shrivastava |
| 5,521,870 A | 5/1996 | Ishikawa |
| 5,523,251 A | 6/1996 | Hong |
| 5,523,972 A | 6/1996 | Rashid et al. |
| 5,530,803 A | 6/1996 | Chang et al. |
| 5,534,804 A | 7/1996 | Woo |
| 5,537,358 A | 7/1996 | Fong |
| 5,544,116 A | 8/1996 | Chao et al. |
| 5,553,018 A | 9/1996 | Wang et al. |
| 5,553,030 A | 9/1996 | Tedrow et al. |
| 5,557,221 A | 9/1996 | Taguchi et al. |
| 5,557,570 A | 9/1996 | Iwahashi |
| 5,559,687 A | 9/1996 | Nicollini et al. |
| 5,563,823 A | 10/1996 | Yiu et al. |
| 5,566,125 A | 10/1996 | Fazio et al. |
| 5,568,085 A | 10/1996 | Eitan et al. |
| 5,579,199 A | 11/1996 | Kawamura et al. |
| 5,581,252 A | 12/1996 | Thomas |
| 5,583,808 A | 12/1996 | Brahmbhatt |
| 5,590,068 A | 12/1996 | Bergemont |
| 5,590,074 A | 12/1996 | Akaogi et al. |
| 5,592,417 A | 1/1997 | Mirabel |
| 5,596,527 A | 1/1997 | Tomioka et al. |
| 5,599,727 A | 2/1997 | Hakozaki et al. |
| 5,600,586 A | 2/1997 | Lee et al. |
| 5,604,804 A | 2/1997 | Micali |
| 5,606,523 A | 2/1997 | Mirabel |
| 5,608,679 A | 3/1997 | Mi et al. |
| 5,612,642 A | 3/1997 | McClintock |
| 5,617,357 A | 4/1997 | Haddad et al. |
| 5,619,452 A | 4/1997 | Miyauchi |
| 5,623,438 A | 4/1997 | Guritz et al. |
| 5,627,790 A | 5/1997 | Golla et al. |
| 5,633,603 A | 5/1997 | Lee |
| 5,636,288 A | 6/1997 | Bonneville et al. |
| 5,644,531 A | 7/1997 | Kuo et al. |

| Patent No. | Date | Inventor(s) |
|---|---|---|
| 5,650,959 A | 7/1997 | Hayashi et al. |
| 5,654,568 A | 8/1997 | Nakao |
| 5,656,513 A | 8/1997 | Wang et al. |
| 5,657,332 A | 8/1997 | Auclair et al. |
| 5,661,060 A | 8/1997 | Gill et al. |
| 5,663,907 A | 9/1997 | Frayer et al. |
| 5,666,365 A | 9/1997 | Kostreski |
| 5,672,959 A | 9/1997 | Der |
| 5,675,280 A | 10/1997 | Nomura |
| 5,677,867 A | 10/1997 | Hazani |
| 5,677,869 A | 10/1997 | Fazio et al. |
| 5,683,925 A | 11/1997 | Irani et al. |
| 5,687,201 A * | 11/1997 | McClellan et al. .......... 375/374 |
| 5,689,459 A | 11/1997 | Chang et al. |
| 5,694,356 A | 12/1997 | Wong et al. |
| 5,696,929 A | 12/1997 | Hasbun et al. |
| 5,708,608 A | 1/1998 | Park et al. |
| 5,712,814 A | 1/1998 | Fratin et al. |
| 5,712,815 A | 1/1998 | Bill et al. |
| 5,715,193 A | 2/1998 | Norman |
| 5,717,581 A | 2/1998 | Canclini |
| 5,717,632 A | 2/1998 | Richart et al. |
| 5,717,635 A | 2/1998 | Akatsu |
| 5,721,781 A | 2/1998 | Deo et al. |
| 5,726,946 A | 3/1998 | Yamagata et al. |
| 5,745,410 A | 4/1998 | Yiu et al. |
| 5,748,534 A | 5/1998 | Dunlap et al. |
| 5,751,037 A | 5/1998 | Aozasa et al. |
| 5,751,637 A | 5/1998 | Chen et al. |
| 5,754,475 A | 5/1998 | Bill et al. |
| 5,760,445 A | 6/1998 | Diaz |
| 5,760,634 A | 6/1998 | Fu |
| 5,768,192 A | 6/1998 | Eitan |
| 5,768,193 A | 6/1998 | Lee et al. |
| 5,771,197 A | 6/1998 | Kim |
| 5,774,395 A | 6/1998 | Richart et al. |
| 5,777,919 A | 7/1998 | Chi-Yung et al. |
| 5,781,476 A | 7/1998 | Seki et al. |
| 5,781,478 A | 7/1998 | Takeuchi et al. |
| 5,783,934 A | 7/1998 | Tran |
| 5,784,314 A | 7/1998 | Sali et al. |
| 5,787,036 A | 7/1998 | Okazawa |
| 5,793,079 A | 8/1998 | Georgescu et al. |
| 5,801,076 A | 9/1998 | Ghneim et al. |
| 5,805,500 A | 9/1998 | Campardo et al. |
| 5,808,506 A | 9/1998 | Tran |
| 5,812,449 A | 9/1998 | Song |
| 5,812,456 A | 9/1998 | Hull et al. |
| 5,812,457 A | 9/1998 | Arase |
| 5,815,435 A | 9/1998 | Van Tran |
| 5,822,256 A | 10/1998 | Bauer et al. |
| 5,825,683 A | 10/1998 | Chang et al. |
| 5,825,686 A | 10/1998 | Schmitt-Landsiedel et al. |
| 5,828,601 A | 10/1998 | Hollmer et al. |
| 5,834,851 A | 11/1998 | Ikeda et al. |
| 5,835,935 A | 11/1998 | Estakhri et al. |
| 5,836,772 A | 11/1998 | Chang et al. |
| 5,841,700 A | 11/1998 | Chang |
| 5,847,441 A | 12/1998 | Cutter et al. |
| 5,861,771 A | 1/1999 | Matsuda et al. |
| 5,862,076 A | 1/1999 | Eitan |
| 5,864,164 A | 1/1999 | Wen |
| 5,867,429 A | 2/1999 | Chen et al. |
| 5,870,334 A | 2/1999 | Hemink et al. |
| 5,870,335 A | 2/1999 | Khan et al. |
| 5,872,848 A | 2/1999 | Romney et al. |
| 5,875,128 A | 2/1999 | Ishizuka et al. |
| 5,877,537 A | 3/1999 | Aoki |
| 5,880,620 A | 3/1999 | Gitlin et al. |
| 5,886,927 A | 3/1999 | Takeuchi |
| RE36,179 E | 4/1999 | Shimoda |
| 5,892,710 A | 4/1999 | Fazio et al. |
| 5,903,031 A | 5/1999 | Yamada et al. |
| 5,910,924 A | 6/1999 | Tanaka et al. |
| 5,920,226 A * | 7/1999 | Mimura ..................... 327/537 |
| 5,920,503 A | 7/1999 | Lee et al. |
| 5,920,507 A | 7/1999 | Takeuchi et al. |
| 5,926,409 A | 7/1999 | Engh et al. |
| 5,930,195 A | 7/1999 | Komatsu et al. |
| 5,933,366 A | 8/1999 | Yoshikawa |
| 5,933,367 A | 8/1999 | Matsuo et al. |
| 5,936,888 A | 8/1999 | Sugawara |
| 5,940,332 A | 8/1999 | Artieri |
| 5,946,258 A | 8/1999 | Evertt et al. |
| 5,946,558 A | 8/1999 | Hsu |
| 5,949,714 A | 9/1999 | Hemink et al. |
| 5,949,728 A | 9/1999 | Liu et al. |
| 5,959,311 A | 9/1999 | Shih et al. |
| 5,963,412 A | 10/1999 | En |
| 5,963,465 A | 10/1999 | Eitan |
| 5,966,603 A | 10/1999 | Eitan |
| 5,969,989 A | 10/1999 | Iwahashi |
| 5,969,993 A | 10/1999 | Takeshima |
| 5,973,373 A | 10/1999 | Krautschneider et al. |
| 5,982,666 A | 11/1999 | Campardo |
| 5,986,940 A | 11/1999 | Atsumi et al. |
| 5,990,526 A | 11/1999 | Bez et al. |
| 5,991,201 A | 11/1999 | Kuo et al. |
| 5,991,202 A | 11/1999 | Derhacobian et al. |
| 5,991,517 A | 11/1999 | Harari et al. |
| 5,999,444 A | 12/1999 | Fujiwara et al. |
| 5,999,494 A | 12/1999 | Holzrichter |
| 6,000,006 A | 12/1999 | Bruce et al. |
| 6,005,423 A | 12/1999 | Schultz |
| 6,011,715 A | 1/2000 | Pasotti |
| 6,011,725 A | 1/2000 | Eitan |
| 6,018,186 A | 1/2000 | Hsu |
| 6,020,241 A | 2/2000 | You et al. |
| 6,028,324 A | 2/2000 | Su et al. |
| 6,030,871 A | 2/2000 | Eitan |
| 6,034,403 A | 3/2000 | Wu |
| 6,034,896 A | 3/2000 | Ranaweera et al. |
| 6,037,627 A | 3/2000 | Kitamura et al. |
| 6,040,610 A | 3/2000 | Noguchi et al. |
| 6,040,996 A | 3/2000 | Kong |
| 6,044,019 A | 3/2000 | Cernea et al. |
| 6,044,022 A | 3/2000 | Nachumovsky |
| 6,063,666 A | 5/2000 | Chang et al. |
| 6,064,226 A | 5/2000 | Earl |
| 6,064,251 A | 5/2000 | Park |
| 6,064,591 A | 5/2000 | Takeuchi et al. |
| 6,074,916 A | 6/2000 | Cappelletti |
| 6,075,402 A | 6/2000 | Ghilardelli |
| 6,075,724 A | 6/2000 | Li et al. |
| 6,078,518 A | 6/2000 | Chevallier |
| 6,081,456 A | 6/2000 | Dadashev |
| 6,084,794 A | 7/2000 | Lu et al. |
| 6,091,640 A | 7/2000 | Kawahara et al. |
| 6,094,095 A | 7/2000 | Murray et al. |
| 6,097,639 A | 8/2000 | Choi et al. |
| 6,107,862 A | 8/2000 | Mukainakano et al. |
| 6,108,240 A | 8/2000 | Lavi et al. |
| 6,108,241 A | 8/2000 | Chevallier |
| 6,117,714 A | 9/2000 | Beatty |
| 6,118,207 A | 9/2000 | Ormerod et al. |
| 6,118,692 A | 9/2000 | Banks |
| 6,122,198 A | 9/2000 | Haddad et al. |
| 6,128,226 A | 10/2000 | Eitan et al. |
| 6,128,227 A | 10/2000 | Kim |
| 6,130,452 A | 10/2000 | Lu et al. |
| 6,130,572 A | 10/2000 | Ghilardelli et al. |
| 6,130,574 A | 10/2000 | Bloch et al. |
| 6,133,095 A | 10/2000 | Eitan et al. |
| 6,134,156 A | 10/2000 | Eitan |
| 6,137,718 A | 10/2000 | Reisinger |
| 6,147,904 A | 11/2000 | Liron |

| | | | | | | |
|---|---|---|---|---|---|---|
| 6,147,906 | A | 11/2000 | Bill et al. | 6,344,959 B1 | 2/2002 | Milazzo |
| 6,148,435 | A | 11/2000 | Bettman | 6,346,442 B1 | 2/2002 | Aloni et al. |
| 6,150,800 | A | 11/2000 | Kinoshita et al. | 6,348,381 B1 | 2/2002 | Jong |
| 6,154,081 | A | 11/2000 | Pakkala et al. | 6,348,711 B1 | 2/2002 | Eitan |
| 6,156,149 | A | 12/2000 | Cheung et al. | 6,351,415 B1 | 2/2002 | Kushnarenko |
| 6,157,242 | A | 12/2000 | Fukui | 6,353,356 B1 | 3/2002 | Liu |
| 6,157,570 | A | 12/2000 | Nachumovsky | 6,353,554 B1 | 3/2002 | Banks |
| 6,163,048 | A | 12/2000 | Hirose et al. | 6,353,555 B1 | 3/2002 | Jeong |
| 6,163,484 | A | 12/2000 | Uekubo | 6,356,062 B1 | 3/2002 | Elmhurst et al. |
| 6,169,691 | B1 | 1/2001 | Pasotti et al. | 6,356,469 B1 | 3/2002 | Roohparvar et al. |
| 6,175,519 | B1 | 1/2001 | Lu et al. | 6,359,501 B2 | 3/2002 | Lin et al. |
| 6,175,523 | B1 | 1/2001 | Yang et al. | 6,374,337 B1 | 4/2002 | Estakhri |
| 6,181,597 | B1 | 1/2001 | Nachumovsky | 6,385,086 B1 | 5/2002 | Mihara et al. |
| 6,181,605 | B1 | 1/2001 | Hollmer et al. | 6,396,741 B1 | 5/2002 | Bloom et al. |
| 6,185,143 | B1 | 2/2001 | Perner et al. | 6,400,209 B1 | 6/2002 | Matsuyama et al. |
| 6,188,211 | B1 | 2/2001 | Rincon-Mora et al. | 6,400,607 B1 | 6/2002 | Pasotti et al. |
| 6,190,966 | B1 | 2/2001 | Ngo et al. | 6,404,290 B1 * | 6/2002 | Voo ............................. 331/8 |
| 6,192,445 | B1 | 2/2001 | Rezvani | 6,407,537 B2 | 6/2002 | Antheunis |
| 6,195,196 | B1 | 2/2001 | Kimura et al. | 6,410,388 B1 | 6/2002 | Kluth et al. |
| 6,198,342 | B1 | 3/2001 | Kawai | 6,417,081 B1 | 7/2002 | Thurgate |
| 6,201,282 | B1 | 3/2001 | Eitan | 6,418,506 B1 | 7/2002 | Pashley et al. |
| 6,201,737 | B1 | 3/2001 | Hollmer et al. | 6,424,570 B1 * | 7/2002 | Le et al. ................. 365/185.18 |
| 6,205,055 | B1 | 3/2001 | Parker | 6,426,898 B1 | 7/2002 | Mihnea et al. |
| 6,205,056 | B1 | 3/2001 | Pan et al. | 6,429,063 B1 | 8/2002 | Eitan |
| 6,205,059 | B1 | 3/2001 | Gutala et al. | 6,433,624 B1 | 8/2002 | Grossnickle et al. |
| 6,208,200 | B1 | 3/2001 | Arakawa | 6,436,766 B1 | 8/2002 | Rangarajan et al. |
| 6,208,557 | B1 | 3/2001 | Bergemont et al. | 6,436,768 B1 | 8/2002 | Yang et al. |
| 6,214,666 | B1 | 4/2001 | Mehta | 6,438,031 B1 | 8/2002 | Fastow |
| 6,215,148 | B1 | 4/2001 | Eitan | 6,438,035 B2 | 8/2002 | Yamamoto et al. |
| 6,215,697 | B1 | 4/2001 | Lu et al. | 6,440,797 B1 | 8/2002 | Wu et al. |
| 6,215,702 | B1 | 4/2001 | Derhacobian et al. | 6,442,074 B1 | 8/2002 | Hamilton et al. |
| 6,218,695 | B1 | 4/2001 | Nachumovsky | 6,445,030 B1 | 9/2002 | Wu et al. |
| 6,219,277 | B1 | 4/2001 | Devin et al. | 6,448,750 B1 | 9/2002 | Shor et al. |
| 6,219,290 | B1 | 4/2001 | Chang et al. | 6,449,188 B1 | 9/2002 | Fastow |
| 6,222,762 | B1 | 4/2001 | Guterman et al. | 6,449,190 B1 | 9/2002 | Bill |
| 6,222,768 | B1 | 4/2001 | Hollmer et al. | 6,452,438 B1 | 9/2002 | Li |
| 6,233,180 | B1 | 5/2001 | Eitan et al. | 6,455,896 B1 | 9/2002 | Chou et al. |
| 6,240,032 | B1 | 5/2001 | Fukumoto | 6,456,528 B1 | 9/2002 | Chen |
| 6,240,040 | B1 | 5/2001 | Akaogi et al. | 6,456,533 B1 | 9/2002 | Hamilton et al. |
| 6,246,555 | B1 | 6/2001 | Tham | 6,456,539 B1 | 9/2002 | Nguyen et al. |
| 6,252,442 | B1 | 6/2001 | Malherbe | 6,458,656 B1 | 10/2002 | Park et al. |
| 6,252,799 | B1 | 6/2001 | Liu et al. | 6,458,677 B1 | 10/2002 | Hopper et al. |
| 6,256,231 | B1 | 7/2001 | Lavi et al. | 6,469,929 B1 | 10/2002 | Kushnarenko et al. |
| 6,261,904 | B1 | 7/2001 | Pham et al. | 6,469,935 B2 | 10/2002 | Hayashi |
| 6,265,268 | B1 | 7/2001 | Halliyal et al. | 6,472,706 B2 | 10/2002 | Widdershoven et al. |
| 6,266,281 | B1 | 7/2001 | Derhacobian et al. | 6,477,084 B1 | 11/2002 | Eitan |
| 6,272,047 | B1 | 8/2001 | Mihnea et al. | 6,477,085 B1 | 11/2002 | Kuo |
| 6,275,414 | B1 | 8/2001 | Randolph et al. | 6,490,204 B2 | 12/2002 | Bloom et al. |
| 6,281,545 | B1 | 8/2001 | Liang et al. | 6,496,414 B2 | 12/2002 | Kasa et al. |
| 6,282,133 | B1 | 8/2001 | Nakagawa et al. | 6,504,756 B2 | 1/2003 | Gonzalez et al. |
| 6,282,145 | B1 | 8/2001 | Tran et al. | 6,510,082 B1 | 1/2003 | Le et al. |
| 6,285,246 | B1 | 9/2001 | Basu | 6,512,701 B1 | 1/2003 | Hamilton et al. |
| 6,285,574 | B1 | 9/2001 | Eitan | 6,519,180 B2 | 2/2003 | Tran et al. |
| 6,285,589 | B1 | 9/2001 | Kajitani | 6,519,182 B1 | 2/2003 | Derhacobian et al. |
| 6,285,614 | B1 | 9/2001 | Mulatti et al. | 6,522,585 B2 | 2/2003 | Pasternak |
| 6,292,394 | B1 | 9/2001 | Cohen et al. | 6,525,969 B1 | 2/2003 | Kurihara et al. |
| 6,297,096 | B1 | 10/2001 | Boaz | 6,528,390 B2 | 3/2003 | Komori et al. |
| 6,297,143 | B1 | 10/2001 | Foote et al. | 6,529,412 B1 | 3/2003 | Chen et al. |
| 6,297,974 | B1 | 10/2001 | Ganesan et al. | 6,532,173 B2 | 3/2003 | Lioka et al. |
| 6,304,485 | B1 | 10/2001 | Harari et al. | 6,535,020 B1 | 3/2003 | Yin |
| 6,307,784 | B1 | 10/2001 | Hamilton et al. | 6,535,434 B2 | 3/2003 | Maayan et al. |
| 6,307,807 | B1 | 10/2001 | Sakui et al. | 6,537,881 B1 | 3/2003 | Rangarjan et al. |
| 6,308,485 | B1 | 10/2001 | Harari et al. | 6,538,270 B1 | 3/2003 | Randolph et al. |
| 6,320,786 | B1 | 11/2001 | Chang et al. | 6,541,816 B2 | 4/2003 | Ramsbey et al. |
| 6,324,094 | B1 | 11/2001 | Chevallier | 6,552,387 B1 | 4/2003 | Eitan |
| 6,326,265 | B1 | 12/2001 | Liu et al. | 6,555,436 B2 | 4/2003 | Ramsbey et al. |
| 6,330,192 | B1 | 12/2001 | Ohba et al. | 6,559,500 B2 | 5/2003 | Torii |
| 6,331,950 | B1 | 12/2001 | Kuo et al. | 6,562,683 B1 | 5/2003 | Wang et al. |
| 6,335,874 | B1 | 1/2002 | Eitan | 6,566,194 B1 | 5/2003 | Ramsbey et al. |
| 6,335,990 | B1 | 1/2002 | Chen et al. | 6,566,699 B2 | 5/2003 | Eitan |
| 6,337,502 | B1 | 1/2002 | Eitan et al. | 6,567,303 B1 | 5/2003 | Hamilton et al. |
| 6,339,556 | B1 | 1/2002 | Watanabe | 6,567,312 B1 | 5/2003 | Torii et al. |
| 6,343,033 | B1 | 1/2002 | Parker | 6,567,316 B1 | 5/2003 | Ohba et al. |

| | | |
|---|---|---|
| 6,570,211 B1 | 5/2003 | He et al. |
| 6,574,139 B2 | 6/2003 | Kurihara |
| 6,577,514 B2 | 6/2003 | Shor et al. |
| 6,577,532 B1 | 6/2003 | Chevallier |
| 6,577,547 B2 | 6/2003 | Ukon |
| 6,583,005 B2 | 6/2003 | Hashimoto et al. |
| 6,583,007 B1 | 6/2003 | Eitan |
| 6,583,479 B1 | 6/2003 | Fastow et al. |
| 6,584,017 B2 | 6/2003 | Maayan et al. |
| 6,590,811 B1 | 7/2003 | Hamilton et al. |
| 6,593,606 B1 | 7/2003 | Randolph et al. |
| 6,594,181 B1 | 7/2003 | Yamada |
| 6,608,526 B1 | 8/2003 | Sauer |
| 6,608,905 B1 | 8/2003 | Muza et al. |
| 6,614,052 B1 | 9/2003 | Zhang |
| 6,614,295 B2 | 9/2003 | Tsuchi |
| 6,614,686 B1 | 9/2003 | Kawamura |
| 6,614,690 B2 | 9/2003 | Roohparvar |
| 6,614,692 B2 | 9/2003 | Maayan et al. |
| 6,617,179 B1 | 9/2003 | Kim |
| 6,617,215 B1 | 9/2003 | Halliyal et al. |
| 6,618,290 B1 | 9/2003 | Wang et al. |
| 6,624,672 B2 | 9/2003 | Confaloneri et al. |
| 6,627,555 B2 | 9/2003 | Eitan et al. |
| 6,630,384 B1 | 10/2003 | Sun et al. |
| 6,633,496 B2 | 10/2003 | Maayan et al. |
| 6,633,499 B1 | 10/2003 | Eitan et al. |
| 6,633,956 B1 | 10/2003 | Mitani |
| 6,636,440 B2 | 10/2003 | Maayan et al. |
| 6,639,271 B1 | 10/2003 | Zheng et al. |
| 6,639,837 B2 | 10/2003 | Takano et al. |
| 6,639,844 B1 | 10/2003 | Liu et al. |
| 6,639,849 B2 | 10/2003 | Takahashi et al. |
| 6,642,148 B1 | 11/2003 | Ghandehari et al. |
| 6,642,573 B1 | 11/2003 | Halliyal et al. |
| 6,642,586 B2 | 11/2003 | Takahashi |
| 6,643,170 B2 | 11/2003 | Huang et al. |
| 6,643,177 B1 | 11/2003 | Le et al. |
| 6,643,178 B2 | 11/2003 | Kurihara |
| 6,643,181 B2 | 11/2003 | Sofer et al. |
| 6,645,801 B1 | 11/2003 | Ramsbey et al. |
| 6,649,972 B2 | 11/2003 | Eitan |
| 6,650,568 B2 | 11/2003 | Iijima |
| 6,653,190 B1 | 11/2003 | Yang et al. |
| 6,653,191 B1 | 11/2003 | Yang et al. |
| 6,654,296 B2 | 11/2003 | Jang et al. |
| 6,664,588 B2 | 12/2003 | Eitan |
| 6,665,769 B2 | 12/2003 | Cohen et al. |
| 6,670,241 B1 | 12/2003 | Kamal et al. |
| 6,670,669 B1 | 12/2003 | Kawamura |
| 6,674,138 B1 | 1/2004 | Halliyal et al. |
| 6,677,805 B2 | 1/2004 | Shor et al. |
| 6,680,509 B1 | 1/2004 | Wu et al. |
| 6,686,242 B2 | 2/2004 | Willer et al. |
| 6,690,602 B1 | 2/2004 | Le et al. |
| 6,693,483 B2 | 2/2004 | Deml et al. |
| 6,700,818 B2 | 3/2004 | Shappir et al. |
| 6,717,207 B2 | 4/2004 | Kato |
| 6,723,518 B2 | 4/2004 | Papsidero et al. |
| 6,731,542 B1 | 5/2004 | Le et al. |
| 6,738,289 B2 | 5/2004 | Gongwer et al. |
| 6,744,224 B2 * | 6/2004 | Ishii .................... 315/291 |
| 6,744,692 B2 | 6/2004 | Shiota et al. |
| 6,765,259 B2 | 7/2004 | Kim |
| 6,768,165 B1 | 7/2004 | Eitan |
| 6,781,876 B2 | 8/2004 | Forbes et al. |
| 6,788,579 B2 | 9/2004 | Gregori et al. |
| 6,791,396 B2 | 9/2004 | Shor et al. |
| 6,794,249 B2 | 9/2004 | Palm et al. |
| 6,794,280 B2 | 9/2004 | Chang |
| 6,798,699 B2 | 9/2004 | Mihnea et al. |
| 6,809,573 B2 * | 10/2004 | Kim .................... 327/536 |
| 6,818,956 B2 | 11/2004 | Kuo et al. |
| 6,829,172 B2 | 12/2004 | Bloom et al. |
| 6,831,872 B2 | 12/2004 | Matsuoka |
| 6,836,431 B2 | 12/2004 | Chang |
| 6,839,280 B1 | 1/2005 | Chindalore et al. |
| 6,859,028 B2 | 2/2005 | Toner |
| 6,870,772 B1 | 3/2005 | Nitta et al. |
| 6,871,258 B2 | 3/2005 | Micheloni et al. |
| 6,885,585 B2 | 4/2005 | Maayan et al. |
| 6,885,590 B2 | 4/2005 | Zheng et al. |
| 6,906,357 B1 | 6/2005 | Vashchenko et al. |
| 6,912,160 B2 | 6/2005 | Yamada |
| 6,917,541 B2 | 7/2005 | Shimbayashi et al. |
| 6,917,544 B2 | 7/2005 | Maayan et al. |
| 6,928,001 B2 | 8/2005 | Avni et al. |
| 6,930,928 B2 | 8/2005 | Liu et al. |
| 6,937,521 B2 | 8/2005 | Avni |
| 6,937,523 B2 | 8/2005 | Eshel |
| 6,954,393 B2 | 10/2005 | Lusky et al. |
| 6,967,872 B2 | 11/2005 | Quader et al. |
| 6,967,896 B2 | 11/2005 | Eisen et al. |
| 6,977,410 B2 | 12/2005 | Naso et al. |
| 6,981,188 B2 | 12/2005 | Galzur et al. |
| 6,996,692 B2 | 2/2006 | Kuono |
| 7,043,672 B2 | 5/2006 | Merritt |
| 7,079,420 B2 | 7/2006 | Shappir et al. |
| 7,116,155 B2 * | 10/2006 | Pan ....................... 327/536 |
| 7,116,577 B2 | 10/2006 | Eitan |
| 7,125,763 B1 | 10/2006 | Sobek et al. |
| 7,203,118 B2 * | 4/2007 | Yaoi et al. ............... 365/226 |
| 2001/0006477 A1 | 7/2001 | Banks |
| 2002/0004878 A1 | 1/2002 | Norman |
| 2002/0004921 A1 | 1/2002 | Muranaka et al. |
| 2002/0064911 A1 | 5/2002 | Eitan |
| 2002/0101765 A1 | 8/2002 | Mihnea et al. |
| 2002/0132436 A1 | 9/2002 | Eliyahu et al. |
| 2002/0140109 A1 | 10/2002 | Keshavarzi et al. |
| 2002/0145465 A1 | 10/2002 | Shor et al. |
| 2002/0191465 A1 | 12/2002 | Maayan et al. |
| 2002/0199065 A1 | 12/2002 | Subramoney et al. |
| 2003/0001213 A1 | 1/2003 | Lai |
| 2003/0021155 A1 | 1/2003 | Yachareni et al. |
| 2003/0072192 A1 | 4/2003 | Bloom et al. |
| 2003/0076710 A1 | 4/2003 | Sofer et al. |
| 2003/0093233 A1 * | 5/2003 | Rajguru ................. 702/64 |
| 2003/0100153 A1 | 5/2003 | Kunori |
| 2003/0117841 A1 | 6/2003 | Yamashita |
| 2003/0131186 A1 | 7/2003 | Buhr |
| 2003/0134476 A1 | 7/2003 | Roizin et al. |
| 2003/0142544 A1 | 7/2003 | Maayan et al. |
| 2003/0145176 A1 | 7/2003 | Dvir et al. |
| 2003/0145188 A1 | 7/2003 | Cohen et al. |
| 2003/0155659 A1 | 8/2003 | Verma et al. |
| 2003/0190786 A1 | 10/2003 | Ramsbey et al. |
| 2003/0197221 A1 | 10/2003 | Shinozaki et al. |
| 2003/0202411 A1 | 10/2003 | Yamada |
| 2003/0206435 A1 | 11/2003 | Takahashi |
| 2003/0208663 A1 | 11/2003 | Van Buskirk et al. |
| 2003/0209767 A1 | 11/2003 | Takahashi et al. |
| 2003/0214844 A1 | 11/2003 | Iijima |
| 2003/0214852 A1 | 11/2003 | Chang |
| 2003/0218207 A1 | 11/2003 | Hashimoto et al. |
| 2003/0218913 A1 | 11/2003 | Le et al. |
| 2003/0222303 A1 | 12/2003 | Fukuda et al. |
| 2003/0227796 A1 | 12/2003 | Miki et al. |
| 2004/0007730 A1 | 1/2004 | Chou et al. |
| 2004/0012993 A1 | 1/2004 | Kurihara |
| 2004/0013000 A1 | 1/2004 | Torii |
| 2004/0014280 A1 | 1/2004 | Willer et al. |
| 2004/0014290 A1 | 1/2004 | Yang et al. |
| 2004/0017717 A1 | 1/2004 | Morishima |
| 2004/0021172 A1 | 2/2004 | Zheng et al. |
| 2004/0027858 A1 | 2/2004 | Takahashi et al. |
| 2004/0117395 A1 | 6/2004 | Gong et al. |

| | | | | | | |
|---|---|---|---|---|---|---|
| 2004/0136236 | A1 | 7/2004 | Cohen | JP | 2002-216488 | 8/2002 |
| 2004/0151034 | A1 | 8/2004 | Shor et al. | JP | 3358663 | 10/2002 |
| 2004/0153621 | A1 | 8/2004 | Polansky et al. | JP | 2006115140 A * | 4/2006 |
| 2004/0157393 | A1 | 8/2004 | Hwang | WO | WO 81/00790 | 3/1981 |
| 2004/0222437 | A1 | 11/2004 | Avni et al. | WO | WO 96/15553 | 5/1996 |
| 2005/0058005 | A1 | 3/2005 | Shappir et al. | WO | WO 96/25741 | 8/1996 |
| 2005/0078026 | A1 | 4/2005 | Cai | WO | WO 98/03977 | 1/1998 |
| 2005/0078528 | A1 | 4/2005 | Tsang et al. | WO | WO 99/31670 | 6/1999 |
| 2005/0117395 | A1 | 6/2005 | Maayan et al. | WO | WO 99/57728 | 11/1999 |
| 2005/0117601 | A1 | 6/2005 | Anderson et al. | WO | WO 00/46808 | 8/2000 |
| 2005/0140405 | A1 | 6/2005 | Do et al. | WO | WO 01/65566 | 9/2001 |
| 2005/0213593 | A1 | 9/2005 | Anderson et al. | WO | WO 01/65567 | 9/2001 |
| 2005/0232024 | A1 | 10/2005 | Atir et al. | WO | WO 01/84552 | 11/2001 |
| 2006/0015691 | A1 | 1/2006 | Louie et al. | WO | WO 02/43073 | 5/2002 |
| 2006/0039212 | A1 * | 2/2006 | Chiang et al. ............... 365/201 | WO | WO 03/032393 | 4/2003 |
| 2006/0084219 | A1 | 4/2006 | Lusky et al. | WO | WO 03/036651 | 5/2003 |
| 2006/0126382 | A1 | 6/2006 | Maayan et al. | WO | WO 03/054964 | 7/2003 |
| 2006/0126983 | A1 | 6/2006 | Shappir et al. | WO | WO 03/063167 | 7/2003 |
| 2007/0080905 | A1 * | 4/2007 | Takahara ..................... 345/76 | WO | WO 03/063168 | 7/2003 |
| 2007/0133317 | A1 * | 6/2007 | Yuan et al. ............ 365/189.09 | WO | WO 03/079370 | 9/2003 |
| | | | | WO | WO 03/079446 | 9/2003 |

FOREIGN PATENT DOCUMENTS

| | | |
|---|---|---|
| EP | 0751560 | 6/1995 |
| EP | 0693781 | 1/1996 |
| EP | 0 822 557 | 2/1998 |
| EP | 0 843 398 | 5/1998 |
| EP | 0580467 | 9/1998 |
| EP | 0461764 | 7/2000 |
| EP | 1 071 096 | 1/2001 |
| EP | 1073120 | 1/2001 |
| EP | 1 091 418 | 4/2001 |
| EP | 1126468 | 8/2001 |
| EP | 0740307 | 12/2001 |
| EP | 1164597 | 12/2001 |
| EP | 1 207 552 | 5/2002 |
| EP | 1 223 586 | 7/2002 |
| EP | 1324343 | 7/2003 |
| EP | 1 365 452 | 11/2003 |
| EP | 001217744 | 3/2004 |
| GB | 1297899 | 11/1972 |
| GB | 2157489 | 3/1985 |
| JP | 54-053929 | 4/1979 |
| JP | 54125938 | 9/1979 |
| JP | 58094199 U | 6/1983 |
| JP | 60-200566 | 10/1985 |
| JP | 60201594 | 10/1985 |
| JP | 63-249375 | 10/1988 |
| JP | 3-285358 | 12/1991 |
| JP | 04-226071 | 8/1992 |
| JP | 04-291962 | 10/1992 |
| JP | 05021758 | 1/1993 |
| JP | 05-326893 | 12/1993 |
| JP | 06151833 | 5/1994 |
| JP | 6-232416 | 8/1994 |
| JP | 07193151 | 7/1995 |
| JP | 08-106791 | 4/1996 |
| JP | 08-297988 | 11/1996 |
| JP | 09-017981 | 1/1997 |
| JP | 09162314 | 6/1997 |
| JP | 10-055691 | 2/1998 |
| JP | 10-106276 | 4/1998 |
| JP | 10-199263 | 7/1998 |
| JP | 10-228784 | 8/1998 |
| JP | 10-228786 | 8/1998 |
| JP | 10 334676 | 12/1998 |
| JP | 11-162182 | 6/1999 |
| JP | 11-219593 | 8/1999 |
| JP | 11-354758 | 12/1999 |
| JP | 2000-315392 | 11/2000 |
| JP | 2001-085646 | 3/2001 |
| JP | 2001-118392 | 4/2001 |
| JP | 2001-156189 | 6/2001 |

| | | |
|---|---|---|
| WO | WO 03/083916 | 10/2003 |
| WO | WO 03/088258 | 10/2003 |
| WO | WO 03/088259 | 10/2003 |
| WO | WO 03/088260 | 10/2003 |
| WO | WO 03/088261 | 10/2003 |
| WO | WO 03/088353 | 10/2003 |
| WO | WO 03/100790 | 12/2003 |

OTHER PUBLICATIONS

U.S. Appl. No. 11/489,327, filed Jul. 18, 2006, Eitan et al.
U.S. Appl. No. 11/440,624, filed May 24, 2006, Lusky et al.
U.S. Appl. No. 11/489,747, filed Jul. 18, 2006, Bloom et al.
U.S. Appl. No. 11/336,093, filed Jan. 20, 2006, Eitan et al.
Bude et al., EEPROM/Flash Sub 3.0V drain—Source Bias Hot Carrier Writing, IEDM, 1995, pp. 989-992.
Bude et al., Secondary Electron Flash—a High Performance, Low Power Flash Technology for 0.35 um and below, IEDM, 1997, 279-282.
Bude et al., Modeling Nonequilibrium Hot Carrier Device Effects, Conference of Insulator Specialists of Europe, Jun. 1997, Sweden.
Jung et al., IEEE Journal of Solid-State Circuits, Nov. 1996, 1575-1583, vol. 31, No. 11.
Campardo et al., IEEE Journal of Solid-State Circuits, Nov. 2000, 1655-1667, vol. 35, No. 11.
Lin et al., Novel Source-Controlled Self-Verified Programming for Multilevel EEPROM's, IEEE Transactions on Electron Devices. Jun. 2000, 1166-1174, vol. 47, No. 6.
Chan et al., A True Single-Transistor Oxide-Nitride-Oxide EEPROM Device, IEEE Electron Device Letters, Mar. 1987, vol. EDL-8, No. 3.
Eitan et al., "Hot-Electron Injection into the Oxide in n-Channel MOS Devices", IEEE Transactions on Electron Devices, vol. ED-28, No. 3, pp. 328-370, Mar. 1981.
Roy Anirban, "Characterization and Modeling of Charge Trapping and Retention in Novel Multi-Dielectric Nonvolatile Semiconductor Memory Devices", Microelectronics Laboratory, Sherman Fairchild Center, Department of Computer Science and Electrical Engineering, Bethlehem, Pennsylvania, p. 1-35, 1989.
Tanaka et al., "A Quick Intelligent Page-Programming Architecture and a Shielded Bitline Sensing Method for 3 V-Only NAND Flash Memory", IEEE Journal of Solid-State Circuits, vol. 29, No. 11, Nov. 1994, pp. 1366-1373.
Ma et al., A Dual-bit Split-Gate EEPROM (DSG) Cell in Contactless Array for Single-Vcc High Density Flash Memories, IEEE, 1994, 57-60.
Oshima et al., Process and Device Technologies for 16Mbit EPROMs with Large-Tilt-Angle Implanted P-Pocket Cell, IEEE, Dec. 1990, Ch. 2865-4/90/0000-0095, pp. 5 2 1-5 2 4, San Francisco, California.
Lee, A new approach for the floating-gate MOS nonvolatile memory, Applied Physics Letters, Oct. 1977, 475-476, vol. 31, No. 7, American Institute of Physics.

Glasser et al., MOS Device Electronics, The Design and Analysis of VLSI Circuits, Chapter 2, 67-163, 1998, Addison-Wesley Publishing Company.

Bhattacharyya et al., FET Gate Structure for Nonvolatile N-Channel Read-Mostly Memory Device, IBM Technical Disclosure Bulletin, Nov. 1975, 1768, vol. 18, No. 6.

Ricco et al., Nonvolatile Multilevel Memories for Digital Applications, Dec. 1998, 2399-2421, vol. 86, No. 12 Institute of Electrical and Electronics Engineers, Inc.

Martin, Improved Circuits for the Realization of Switched-Capacitor Filters, IEEE Transactions on Circuits and Systems, Apr. 1980, 237-244, vol. CAS-27.

Tseng et al., "Thin CVD Stacked Gate Dielectric for ULSI Technology", IEEE, pp. 321-214; 1993, 13.1.1-13.1.4.

Pickar, Ion Implantation in Silicon—Physics, Processing, and Microelectronic Devices, Applied Solid State Science, 1975, 151-241, vol. 5, Academic Press.

2 Bit/Cell EEPROM Cell Using Band-To-Band Tunneling for Data Read-Out, IBM Technical Disclosure Bulletin, 1992, 136-140, vol. 35 No. 4B.

Umezawa, et al., A 5-V-Only Operation 0.6-μm Flash EEPROM with Row Decoder Scheme in Triple-Well Structure, IEEE Journal of Solid-State Circuits, 1992, 1540, vol. 27.

Mitchell, et al., A new self-aligned planar array cell for ultra high density EPROMS, 1987.

Esquivel, et al., High Density Contactless, Self Aligned EPROM Cell Array Technology, 1986.

Johns, Martin, Analog Integrated Circuit Design, Jun. 1, 1997, Chapter 10, John Wiley and Sons Inc.

Allen, et al., CMOS Analog Circuit Design, 2002, 259pages, Oxford University Press.

Klinke, et al., A very-high-slew-rate CMOS operational amplifier, IEEE Journal of Solid-State Circuits, 1989, 744-746, 24 vol.

Shor, et al, paper WA2.04.01—Self regulated Four phased charge pump with boosted wells, ISCAS 2002.

Fotouhi, An efficient CMOS line driver for 1.544-Mb/s T1 and 2.048-Mb/s E1 applications, IEEE Journal of Solid-State Circuits, 2003, 226-236pages, 38vol.

P-N Junction Diode, Physics of semiconductor devices, 1981, ch. 2, "A Wiley-Interscience Publication", John Wiley & Sons Publishers.

Chang, Non Volatile Semiconductor Memory Devices, Proceedings of the IEEE, 64 vol., No. 7, pp. 1039-1059; Jul. 1976.

Yoon, Sukyoon, et al., A Novel Substrate Hot Electron and Hole Injection Structure with a double-implanted buried-channel MOSFET, IEEE Transactions on Electron Devices, Dec. 1991, p. 2722, vol. 38, No. 12.

4 Bits of Digital Data Fit in a Single Cell, Technology Newsletter, Electronic Design, Apr. 1, 1996.

M. Specht et al, Novel Dual Bit Tri- Gate Charge Trapping Memory Devices, IEEE Electron Device Letters, vol. 25, No. 12, Dec. 2004, pp. 810-812.

"Design Considerations in Scaled SONOS Nonvolatile Memory Devices" Bu, Jiankang et al. , Lehigh University, Bethlehem, PA, Power Point Presentation, pp. 1-24, 2000; http://klabs.org/richcontent/MemoryContent/nvmt_symp/nvmts_2000/presentations/bu_white_sonos_lehigh_univ.pdf.

"SONOS Nonvolatile Semiconductor Memories for Space and Military Applications", Adams et al., Symposium, 2000. http://klabs.org/richcontent/MemoryContent/nvmt$_{13}$ symp/nvmts_2000/papers/adams_d.pdf.

"Philips Research—Technologies—Embedded Nonvolatile Memories" http://research.philips.com/technologies/ics/nvmemories/index.html.

"Semiconductor Memory: Non-Volatile Memory (NVM)", National University of Singapore, Department of Electrical and Computer Engineering: http://ece.nus.edu.sg/stfpage/elezhucx/myweb/NVM.pdf.

"Saifun Non-Volatile Memory Technology", 1st Edition, 2005, published and written by Saifun Semiconductors Ltd. 1110 pgs.

European Search Report 06100524.5, May 16, 2006.

European Search Report 06100507.0, Mar. 28, 2007.

European Search Report 04791843.8, Feb. 13, 2007.

Lee et al., Scalable 2-bit silicon-oxide-nitride-oxide-silicon (SONOS) memory with physically separated local nitrides under a merged gate; Solid State Electronics 48 (2004), pp. 1771-1775.

Mahapatra et al. , Chisel Flash EEPROM—Part I: Performance and Scaling; IEEE Transactions on Electron Devices, vol. 49. No. 7, Jul. 2002.

Mohapatra et al., Chisel Programming Operation of Scaled NOR Flash EEPROMs—Effect of Voltage Scaling, Device Scaling and Technological Parameters IEEE Transactions on Electron Devices, vol. 50. No. 10, Oct. 2003.

* cited by examiner

MEASURING AND CONTROLLING CURRENT CONSUMPTION AND OUTPUT CURRENT OF CHARGE PUMPS

CROSS-REFERENCE TO RELATED APPLICATIONS

This application claims priority from U.S. Provisional Patent Application No. 60/845,272 filed Sep. 18, 2006.

TECHNICAL FIELD

The present disclosure relates to charge pumps and, more particularly, to measuring and controlling of charge pumps input supply and output current during the operation of a charge pump.

BACKGROUND

A charge pump (CP) is an electronic circuit that uses capacitors as energy storage elements to create either a higher or lower voltage power source. Charge pump circuits are capable of high efficiencies, sometimes as high as 90-95% while being electrically simple circuits. A charge pump circuit is sometimes referred to as a "pipe".

Charge pumps use some form of switching device(s), such as transistors, to control the connection of voltages to the capacitor. A capacitor is an electronic component that can store charges. For instance, to generate a higher voltage, the first stage involves the capacitor being connected across a voltage and charged up. In the second stage, the capacitor is disconnected from the original charging voltage and reconnected with its negative terminal to the original positive charging voltage. Because the capacitor retains the voltage across it (ignoring leakage effects) the positive terminal voltage is added to the original, effectively doubling the voltage. The pulsing nature of the higher voltage output is typically smoothed by the use of an output capacitor.

This is known as the "charge pumping action", which typically operates at tens of MegaHertz (MHz) to minimize the amount of capacitance required. The capacitor used as the charge pump is typically known as the "flying capacitor".

A common application for charge pump circuits is in integrated circuit (IC) level shifters where they are used to derive positive and negative voltages (often +10 V and −10 V) from a single 5 V, 3 V power supply rail or any other supply voltage. Charge pumps can also be used as drivers for LCDs (liquid crystal displays) or white LEDs (light emitting diodes), generating high bias voltages from a single low-voltage supply, such as a battery. Charge pumps are also used to generate high voltage (5 kv and up) for modern neon signs (older signs use a transformer).

Semiconductor non-volatile memories (NVM), such as erasable, programmable read only memory (EPROM), electrically erasable, programmable read only memory (EEPROM) and flash memories, typically require voltage values which are higher than a supply voltage reference (VDD), and lower than a ground voltage reference (GND). Such voltages are referred to as "overvoltages". For example, the erasing operation of a non-volatile memory cell may requires a positive overvoltage equal to about 10 volts (V) as well as a negative overvoltage equal to −8V, both generated from a supply voltage reference VDD ranging between 1.8V and 5V and a ground voltage reference GND, that is conventionally equal to 0V. To generate these positive and negative overvoltages, charge pump ("CP") circuits are typically utilized. These CP circuits are generally realized by cascading (connecting, one after another) a plurality (N) of "basic stages".

Charge pumps may be a key component in Flash RAM (random access memory) devices. These devices may, for example, require a high voltage pulse to "clean out" any existing data in a particular memory cell before it can be written with a new value. Modern Flash RAMs generally operate at 1.8 or 3.3V, but may require about 10V to write.

For all kind of integrated circuits (ICs), and particularly for Flash and similar non-volatile memory (NVM) circuits, (called generally herein as "Flash" or "Flash Memory Circuits") the average current consumption and supply peak current are important electrical parameters, limited by the product specification.

In Flash memory circuits, all internal voltages, which are higher than the supplied voltage, are usually generated by Charge Pump (CP) circuits.

Well-known and widely used charge pump (CP) circuits convert supply voltage power (Vsupply) to output high voltage power with power efficiency (η), where:

input low voltage power can be presented as a product of total charge pump (Icp_in) current consumption and applied supply voltage (Vsupply);

output high voltage power can be calculated as a product of output charge pump (Icp_out) current and output charge pump voltage (Vcp_out). Thus, $$\eta * Icp\_in * Vsupply = Icp\_out * Vcp\_out \quad (1)$$

Icp_in is the total current delivered to the charge pump by the low voltage supply. If all stages of the charge pump are identical, and the voltage supply to the stage's phase drivers (see FIG. 1A) equals to Vsupply, the total charge pump current consumption can be calculated:

$$Icp\_in = I1 + N*I2. \quad \text{(See equation (4), below).}$$

In FIG. 1A, Iout (meaning Icp_out) and Vout (meaning Vcp_out) are presented.

and respectively, $$Icp\_in = 1/\eta * Icp\_out * Vcp\_out / Vsupply \quad (2)$$

From equation (2) it is evident that charge pump (CP) current consumption (Icp_in) depends on the CP's efficiency (η), supply voltage (Vsupply) and output current (Icp_out) supplied to the load. Each of these parameters appears to depend to some extent on the process, temperature, and supply range, including the charge pump's load (Icp_out).

As a result of the possible variations of the above parameters, the current consumption of the charge pump (Icp_in) could exceed the limit of the average current and/or maximal peak current for a Flash memory circuit, as defined by specifications.

NROM Modes of Operation

The following table presents exemplary conditions for programming, erasing and reading a nitride read-only memory (NROM) cell. The program (PGM) operation may utilize channel hot electron (CHE) injection. The erase (ERS) mode of operation may utilize hot hole injection (HHI)

TABLE 1

Exemplary NROM Operating Conditions

| | Vs | Vg | Vd | Vb | time |
|---|---|---|---|---|---|
| Program | +0.5 v | 8-10 v | +4-5 v | 0 v | 0.1-1 µs |
| Erase | 2 v | −7 v | 5 v | 0 v | 100 us |
| Read | 1.3 v | 5 v | 0 v | 0 v | 10-100 ns |

From the table above, it is evident that Vg for the program operation may require a charge pump outputting an overvoltage. Generally, several NROM cells may be programmed at once, which demands capable and robust performance from a charge pump supplying the overvoltage.

Some examples of NROM memory cells may be found in commonly-owned U.S. Pat. Nos. 5,768,192 and 6,011,725, 6,649,972 and 6,552,387.

Some examples of methods of operation of NROM and similar arrays, such as algorithms related to programming, erasing, and/or reading such array, may be found in commonly-owned U.S. Pat. Nos. 6,215,148, 6,292,394 and 6,477,084.

Some examples of methods of operation for each segment or technological application, such as: fast programming methodologies in all flash memory segments, with particular focus on the data flash segment, smart programming algorithms in the code flash and EEPROM segments, and a single device containing a combination of data flash, code flash and/or EEPROM, may be found in commonly-owned U.S. Pat. Nos. 6,954,393 and 6,967,896.

A more complete description of NROM and similar cells and devices, as well as processes for their development may be found at "Non Volatile Memory Technology", 2005 published by Saifun Semiconductor and materials presented at and through http://siliconnexus.com, both incorporated by reference herein in their entirety.

Glossary

Unless otherwise noted, or as may be evident from the context of their usage, any terms, abbreviations, acronyms or scientific symbols and notations used herein are to be given their ordinary meaning in the technical discipline to which the disclosure most nearly pertains. The following terms, abbreviations and acronyms may be used throughout the descriptions presented herein and should generally be given the following meaning unless contradicted or elaborated upon by other descriptions set forth herein. Some of the terms set forth below may be registered trademarks (®).

| | |
|---|---|
| AC | short for alternating current, and sometimes written lowercase as "ac". Alternating current is voltage or current in a circuit that is alternating in polarity at a set frequency, most often 50 or 60 Hz, as typified by current coming out of standard household wall sockets. The "other" type of current that we are familiar with is Direct Current (DC), typified by current coming out of standard household batteries. |
| Capacitor | usually abbreviated "C". A capacitor is a device that stores energy in an electric field created between a pair of conductors on which equal but opposite electric charges have been placed. A capacitor is occasionally referred to using the older term condenser. The amount of charge which can be stored by a capacitor is measured in Farads (F). Capacitors resist changes in voltage, and are an essential component in (for example) power supplies for filtering out unwanted AC noise from a DC signal. A capacitor can release the energy that it has stored. |
| Charge Pump | A power supply which uses capacitors to store and transfer energy to the output, often stepping the voltage up or down. Charge is transferred from one capacitor to another under control of regulator and switching circuitry. |
| CMOS | short for complementary metal oxide semiconductor. CMOS consists of n-channel and p-channel MOS transistors. Due to very low power consumption and dissipation as well minimization of the current in "off" state CMOS is a very effective device configuration for implementation of digital functions. CMOS is a key device in state-of-the-art silicon microelectronics.<br>CMOS Inverter: A pair of two complementary transistors (a p-channel and an n-channel) with the source of the n-channel transistor connected to the drain of the p-channel one and the gates connected to each other. The output (drain of the p-channel transistor) is high whenever the input (gate) is low and the other way round. The CMOS inverter is the basic building block of CMOS digital circuits.<br>NMOS: n-channel CMOS.<br>PMOS: p-channel CMOS. |
| comparator | A comparator, or "voltage comparator" is an amplifier which is configured to compare the magnitude of the voltages at its two inputs (+IN and −IN). The comparator outputs a "high" level if +IN > −IN, or a "low" level if +IN < −IN. A voltage comparator can be considered to be a 1-bit ADC (Analog-to-Digital Converter). |
| Current | usually abbreviated "i", or "I". Electric current is by definition the flow of electric charge. The SI unit of electric current is the ampere (A, or simply "amp"), which is equal to a flow of one coulomb of charge per second. In semiconductor devices, current is often a number of milliamps (mA). There are 1000 milliamps to an amp. By way of analogy, a large river represents a lot of current, a small river represents a small amount of current. The speed at which the river is flowing is analogous to voltage, which exerts a pressure to move the water. Power, is related to the pressure and the volume. |
| DC | short for direct current, and sometimes written lowercase as "dc". An example of direct current is the current supplied by 1.5 volt batteries for common appliances, such as for a flashlight. |
| Diode | A two-terminal semiconductor device that allows current to flow in one direction only; an essential component used in power supplies to convert ac into dc (a process called rectification) |
| Duty-Cycle | The ratio (or averaged ratio) between the time phase where a signal is considered active and the time phase where the signal is considered non-active. |
| EEPROM | short for electrically erasable, programmable read only memory. EEPROMs have the advantage of being able to selectively erase any part of the chip without the need to erase the entire chip and without the need to remove the chip from the circuit. The minimum erase unit is 1 Byte and more typically a full Page. While an erase and rewrite of a location appears nearly instantaneous to the user, the write process is usually slightly slower than the read process; the chip can usually be read at full system speeds. |
| EPROM | short for erasable, programmable read only memory. EPROM is a memory cell in which information (data) can be erased and replaced with new information (data). |
| FET | short for field effect transistor. The FET is a transistor that relies on an electric field to control the shape and hence the conductivity of a "channel" in a semiconductor material. FETs are sometimes used as voltage-controlled resistors. The terminals of FETs are called gate, drain and source. |
| Flash memory | Flash memory is a form of non-volatile memory (EEPROM) that can be electrically erased and reprogrammed. Flash memory architecture allows multiple memory locations to be erased or written in one programming operation. |
| Frequency | usually abbreviated "F". Frequency refers to the number of times per second that a signal (or wave) alternates (or oscillates), typically from positive to negative and back again, and is expressed in Hertz (Hz). Sometimes, frequency is expressed in cycles per second (cps). 1 cps = 1 Hz. Exemplary sound waves which a human ear can hear are from a few Hz up to about 20,000 Hz. The electromagnetic wave corresponding to the visible color red has a frequency of 428,570 GHz (gigahertz). |
| Kirchhoff's law | Kirchhoff's circuit laws are a pair of laws that deal with the conservation of charge and energy in electrical circuits, and were first described in 1845 by Gustav Kirchhoff. Widely used in electrical engineering, they are also called Kirchhoff's rules or simply Kirchhoff's laws.<br>Kirchhoff's Current Law: also called Kirchhoff's first law, Kirchhoff's point rule, Kirchhoff's junction rule, and Kirchhoff's first rule. This law states that at any point in an electrical circuit where charge density is not changing in time, the sum of currents flowing towards that point is equal to the sum of currents flowing away from that point. Generally, in layman's terms, current out (Iout) equals current in (Iin). |

-continued

| | |
|---|---|
| | Kirchhoff's Voltage Law: also called also called Kirchhoff's second law, Kirchhoff's loop rule, and Kirchhoff's second rule. This law states that the directed sum of the electrical potential differences around a circuit must be zero. (Otherwise, it would be possible to build a perpetual motion machine that passed a current in a circle around the circuit.) |
| Micro-controller | A highly integrated chip that contains all of the components needed--a central processing unit (CPU), random access memory (RAM), some form of read-only memory (ROM), input/output ports, and timers--to control a system. Unlike a general-purpose computer, which also includes all of these components, a microcontroller is designed for a very specific task-to control a particular system. As a result, the parts can be simplified and reduced, which cuts down on costs. |
| Micro-processor | (1) A central processing unit (CPU) fabricated on one or more chips, containing the basic arithmetic, logic, and control elements of a computer that are required for processing data; (2) An integrated circuit that accepts coded instructions, executes the instructions received, and delivers signals that describe its internal status. The instructions may be entered or stored internally. Also called "MPU" (microprocessor unit). Widely used as control devices for household appliances, business machines, toys, etc., as well as for microcomputers. |
| Ohm' Law | Ohm's law expresses a simple mathematical relationship between voltage (abbreviated "V", or "E") and current (abbreviated "I"), based on the resistance (abbreviated "R") of a conductor through which the current is flowing. According to Ohms' law, E = I*R. To push a given current through a conductor, when there is more resistance, more voltage is needed. At a given voltage, more resistance means that less current will flow through the conductor. |
| RAM | short for random access memory. RAM refers to data storage formats and equipment that allow the stored data to be accessed in any order - that is, at random, not just in sequence. In contrast, other types of memory devices (such as magnetic tapes, disks, and drums) can access data on the storage medium only in a predetermined order due to constraints in their mechanical design. |
| resistor | usually abbreviated "R". A resistor is a two-terminal electrical or electronic component that resists (impedes) the flow of current, producing a voltage drop between its terminals in accordance with Ohm's law (E = IR, or I equals E over R). The electrical resistance is equal to the voltage drop across the resistor divided by the current that is flowing through the resistor. Resistors are used as part of electrical networks and electronic circuits. |
| transistor | usually abbreviated "Q". The transistor is a solid state semiconductor device which can be used for amplification, switching, voltage stabilization, signal modulation and many other functions. It acts as a variable valve which, based on its input voltage, controls the current it draws from a connected voltage source. Transistors are made either as separate components or as part of an integrated circuit (IC). By way of analogy - the transistor functions like a water tap. The water tap knob controls the flow of the water. In transistors the control tap is called the Base in BJT (Bipolar Junction Transistor), or Gate in FET (Field Effect Transistor) or IGBT (Insulated Gate Bipolar Transistor). Transistors control the flow of electronic current. |
| voltage | usually abbreviated "V", or lowercase "v". Sometimes abbreviated "E". Voltage is measurement of the electromotive force in an electrical circuit or device expressed in volts. It is often taught that voltage can be thought of as being analogous to the pressure (rather than the volume) of water in a waterline. Generally speaking, voltage is the electrical "pressure" that causes current to flow in a circuit. |
| SI units | The SI system of units defines seven SI base units: fundamental physical units defined by an operational definition, and other units which are derived from the seven base units, including:<br>kilogram (kg), a fundamental unit of mass<br>second (s), a fundamental unit of time<br>meter, or metre (in), a fundamental unit of length<br>ampere (A), a fundamental unit of electrical current<br>kelvin (K), a fundamental unit of temperature<br>mole (mol), a fundamental unit of quantity of a substance (based on number of atoms, molecules, ions, electrons or particles, depending on the substance)<br>candela (cd), a fundamental unit luminous intensity<br>degrees Celsius (° C.), a derived unit of temperature.<br>t ° C. = tK − 273.15<br>farad (F), a derived unit of electrical capacitance<br>henry (H), a derived unit of inductance<br>hertz (Hz), a derived unit of frequency<br>ohm (Ω), a derived unit of electrical resistance, impedance, reactance<br>radian (rad), a derived unit of angle (there are $2\pi$ radians in a circle)<br>volt (V), a derived unit of electrical potential (electromotive force)<br>watt (W), a derived unit of power |
| Voltage | abbreviated v, or V. A voltage can be positive or negative (or zero). Usually, a negative voltage is preceded by a minus sign (−). Sometimes a positive voltage is preceded by a plus sign (+), or no sign at all. A number of voltages are relevant with regard to operating a memory cell, and are typically designated by the capital letter "V", followed by another letter or letters. Some exemplary voltages for NVM (such as NROM) memory cells are:<br>Vt  short for threshold voltage<br>Vs  short for source voltage<br>Vd  short for drain voltage<br>Vg  short for gate voltage<br>Vds  the potential difference between source and drain (or drain and source)<br>Vdp  short for drain potential<br>Vb  short for bulk (or substrate) voltage. sometimes written Vsub<br>Vbi  short for built-in potential (n+ to p− typically ~1 V)<br>Vbl  short for bitline voltage. (the bitline may function as source or drain)<br>Vwl  short for wordline voltage (which typically is the same as Vg) |

BRIEF DESCRIPTION (SUMMARY)

It is a general object of embodiments of the present disclosure to provide techniques for measuring and controlling both the current consumption and the output current of a charge pump circuit.

According to an embodiment of the disclosure, generally, current consumption (Icp_in) for the charge pump is kept under defined limits. Current consumption is measured during operation of the charge pump, and based on the measured results, to adjust the charge pump's parameters and/or the charge pump' load (Icp_out).

According to an embodiment of the disclosure, a method of measuring and controlling current consumption (Icp_in) and output current (load current, Icp_out) of a charge pump (CP) having one or more stages, comprises: measuring a first current ($I_1$) coming into the charge pump; and measuring a second current ($I_2$) coming into a driver for at least one of the one or more stages of the charge pump. The current may be controlled by using a control loop affecting one or more parameters of the charge pump and/or a load connected to the charge pump, such as decreasing or increasing the current consumption (Icp_in) by adjusting one or more of: a supply voltage (Vsupply); a stage's voltage (Vφ); the stage's frequency and/or duty-cycle; and the number (N) of stages, or by controlling the current consumption (Icp_in) by adjusting a load connected to the output of the charge pump pipe. The first and second currents may be measured using a resistive path, such as a resistor. The first current may be compared to a first reference current. The second current may be compared to a second reference current. The measured voltages may be compared to reference voltages to control operation of the charge pump. A load connected to the charge pump may comprises non-volatile memory cells, and the charge pump may be implemented on a same integrated circuit (IC) chip as the memory cells.

According to an embodiment of the disclosure, a method of controlling operation of a charge pump (CP) pipe having an input receiving a supply voltage (Vsupply), a number of stages and a number of phases, and an output (Vout, Iout), comprises: measuring current consumption (Icp_in) in the charge pump pipe; and decreasing or increasing the current consumption (Icp_in) by adjusting one or more of: a supply voltage (Vsupply); a stage's voltage (V$\phi$); the stage's frequency and/or duty-cycle; the number (N) of stages; and adjusting a load connected to the output of the charge pump pipe.

According to an embodiment of the disclosure, apparatus for controlling operation of a charge pump (CP) pipe having an input receiving a supply voltage (Vsupply), a number of stages, and an output (Vout, Iout), comprises: means for measuring current consumption (Icp_in) in the charge pump pipe; and means for decreasing or increasing the current consumption (Icp_in) by adjusting one or more of: a supply voltage (Vsupply); a stage's voltage (V$\phi$); the stage's frequency and/or duty-cycle; the number (N) of stages; and adjusting a load connected to the output of the charge pump pipe. Each stage may comprise a switch (S) and a capacitor (C). The means for measuring current consumption (Icp_in) may comprise means for measuring a first current ($I_1$) coming into the charge pump; and means for measuring a second current ($I_2$) coming into a driver (drv1) for a given stage of the charge pump.

According to an embodiment of the disclosure, apparatus for controlling operation of a charge pump (CP) pipe having an input receiving a supply voltage (Vsupply), a number (N) of stages, each stage having a driver (drv), and an output (Vout, Iout), comprises: means for measuring a first current ($I_1$) coming into the charge pump; and means measuring a second current ($I_2$) coming into a driver for at least one of the one or more stages of the charge pump. The apparatus may comprise means for controlling the current consumption and/or output current of the charge pump using a control loop affecting one or more parameters of the charge pump and/or a load connected to the charge pump. The apparatus may comprise means for comparing the first current to a first reference current; and means for comparing the second current to a second reference current. The apparatus may comprise means for controlling the current consumption by adjusting one or more of: a supply voltage (Vsupply); a stage's voltage (V$\phi$); the stage's frequency and/or duty-cycle; and the number (N) of stages; and adjusting a load connected to the output of the charge pump pipe.

BRIEF DESCRIPTION OF THE DRAWINGS

Reference will be made in detail to embodiments of the disclosure, examples of which may be illustrated in the accompanying drawing figures (FIGS). The figures are intended to be illustrative, not limiting. Although the disclosure is generally described in the context of these embodiments, it should be understood that it is not intended to limit the disclosure to these particular embodiments. Elements of the figures may (or may not) be numbered as follows. The most significant digits (hundreds) of the reference number correspond to the figure number. For example, elements of FIG. 1 are typically numbered in the range of 100-199, and elements of FIG. 2 are typically numbered in the range of 200-299. Similar elements throughout the figures may be referred to by similar reference numerals. For example, the element 199 in FIG. 1 may be similar (and possibly identical) to the element 299 in FIG. 2. Throughout the figures, each of a plurality of elements 199 may be referred to individually as 199*a*, 199*b*, 199*c*, etc. Such relationships, if any, between similar elements in the same or different figures will become apparent throughout the specification, including, if applicable, in the claims and abstract.

(Throughout the descriptions set forth in this disclosure, lowercase numbers or letters may be used, instead of subscripts. For example Vg could be written Vg. Generally, lowercase is preferred to maintain uniform font size.) Regarding the use of subscripts (in the drawings, as well as throughout the text of this document), sometimes a character (letter or numeral) is written as a subscript—smaller, and lower than the character (typically a letter) preceding it, such as "Vs" (source voltage) or "H2O" (water). For consistency of font size, such acronyms may be written in regular font, without subscripting, using uppercase and lowercase—for example "Vs" and "H2O".

Figure 1A:
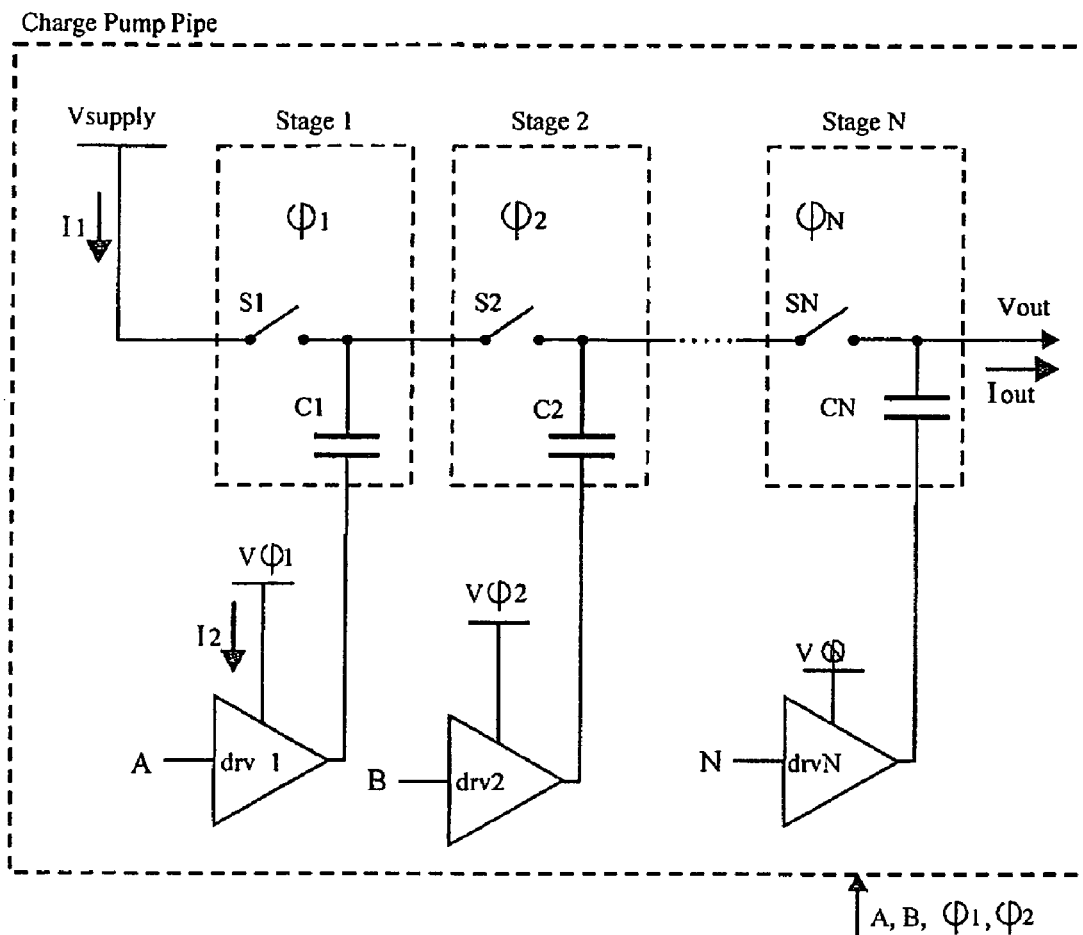

Conventional electronic components may be labeled with conventional schematic-style references comprising a letter (such as A, C, Q, R) indicating the type of electronic component (such as amplifier, capacitor, transistor, resistor, respectively) followed by a number indicating the iteration of that element (such as "1" meaning a first of typically several of a given type of electronic component). Components such as resistors and capacitors typically have two terminals, which may be referred to herein as "ends". In some instances, "signals" are referred to, and reference numerals may point to lines that carry said signals. In the schematic diagrams, the various electronic components are connected to one another, as shown. Usually, lines in a schematic diagram which cross over one another and there is a dot at the intersection of the two lines are connected with one another, else (if there is no dot at the intersection) they are typically not connected with one another.

FIG. 1A is a schematic diagram of a conventional charge pump circuit with current distribution, according to the prior art.

Figure 1B:
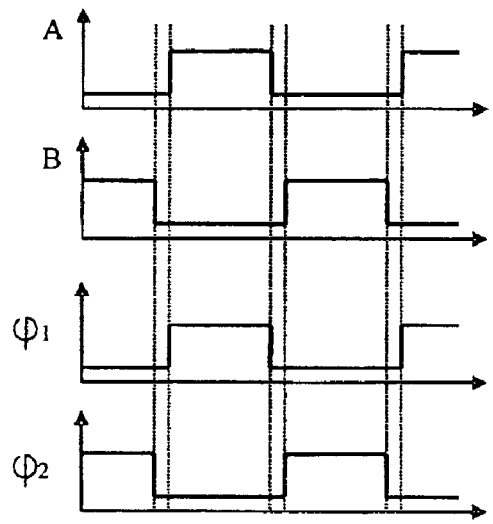

FIG. 1B is a timing diagram related to the charge pump circuit of FIG. 1A.

Figure 2A:
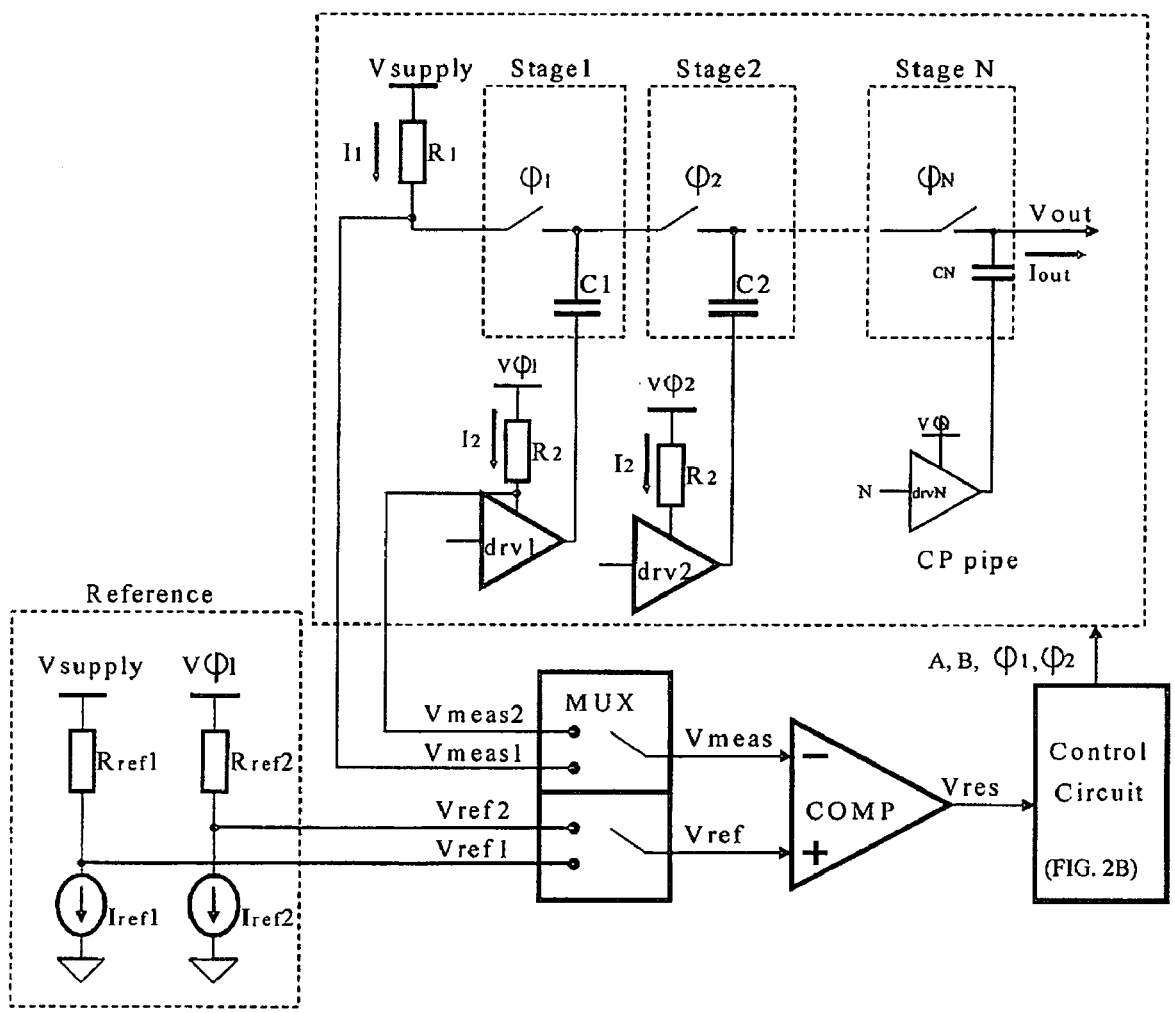

FIG. 2A is a schematic diagram of a charge pump current measuring circuit, including a control circuit, in accordance with an embodiment of the disclosure.

Figure 2B:
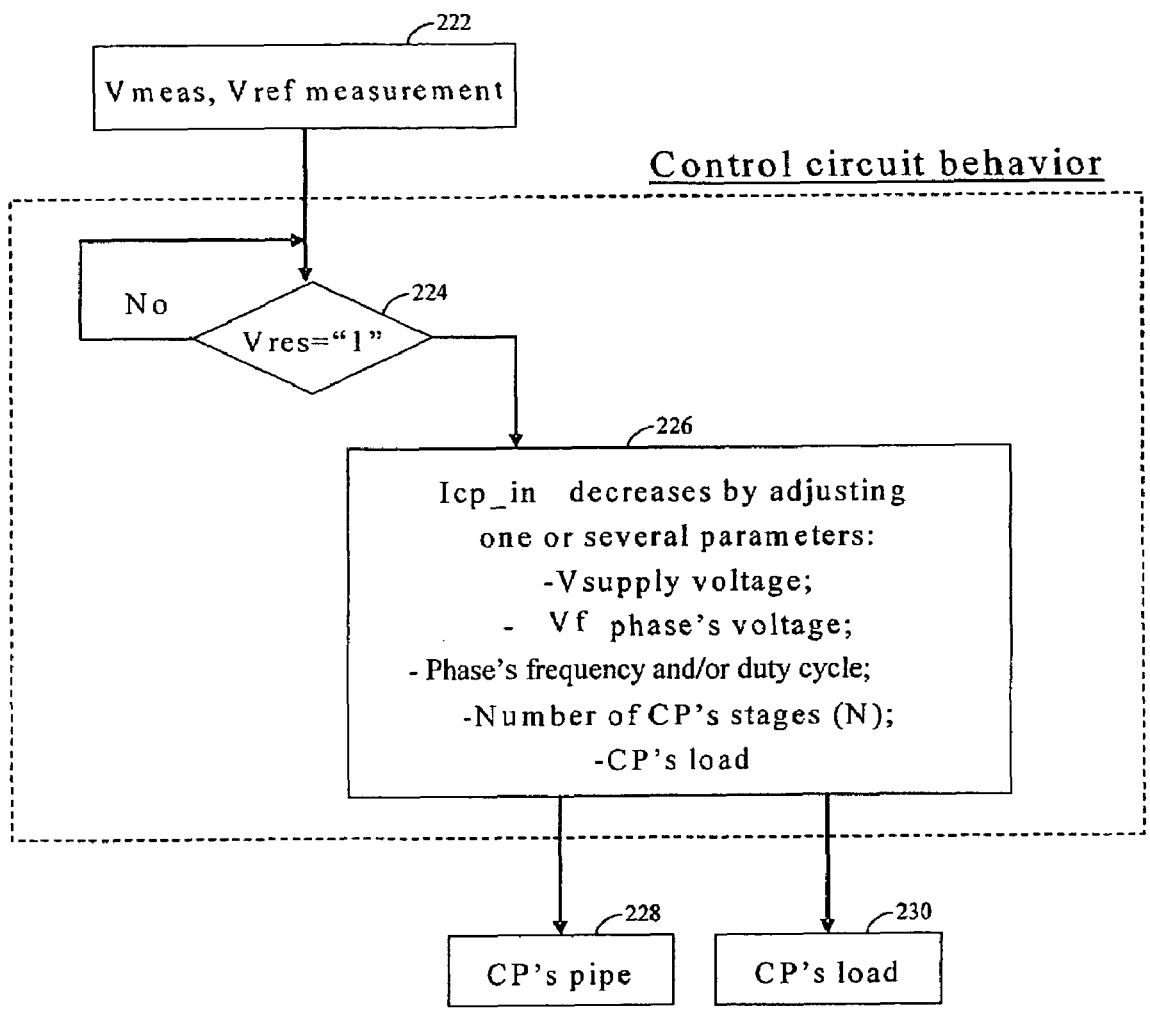

FIG. 2B is a flowchart illustrating behavior of the control circuit of FIG. 2A, in accordance with an embodiment of the disclosure.

DETAILED DESCRIPTION

The disclosure is generally related to measuring current consumption in a charge pump and, also to controlling the operation of the charge pump. Also, a load can be adjusted based on the measurement of current consumption.

Charge pumps are a main cause for the Icc peak current during voltage transitions. In order to reduce Icc peak current of the chip, it is needed to reduce the charge pump Icc peak current during voltage transitions.

According to an embodiment of the disclosure, generally, a dedicated unit measures Vsupply (supply voltage reference) current to the charge pump and controls it by adjusting the output voltage level and/or load of the pump. An exemplary application for the charge pump is in conjunction with NVM memory, such as NROM, in the program and erase operation modes.

Generally, a charge pump output current measuring circuit monitors the charge pump output current changes and generates a logical signal when the output current level rises above a defined current limit. The logical signal is sent to a microcontroller which stops or adjusts the VOUT voltage rising ramp.

FIG. 1A illustrates, in simplified form, a conventional charge pump circuit (referred to as a "pipe") having N stages (Stage 1, Stage 2 . . . Stage N) with current distribution in each branch, wherein:

$I_1$ is the input current of the charge pump's pipe;
$I_2$ is the Current of the Charge Pump's phase driver;
Iout is the output current of the Charge Pump's pipe;
φ1 is the first phase control;
φ2 is the second phase control;
Vφ1 is the voltage supply of the first phase;
Vφ2 is the voltage supply of the second phase;
N is the number of CP stages;
drv1 is the driver for Stage1;
drv2 is the driver for Stage2;
drvN is the driver for StageN;

FIG. 1A shows a charge pump circuit (pipe) having N stages, labelled "Stage 1", "Stage2" . . . "Stage N". The number (N) of charge pump stages may vary (N>=1), depending upon the necessary generated output voltage. If Vφ1=Vφ2=VφN, the charge pump's output voltage (Vout) may be expressed as follows:

$$Vout = V\phi * N + Vsupply \quad (3)$$

In an ideal case for N=1, unfiltered Vout=Vsupply+/−(plus or minus) Vφ. At the beginning, Vsupply (source) charges capacitor through the switch to the voltage level of Vsupply, then the switch closes and the phase signal (generated by driver, Vφ) boosts (or reduces) the capacitor's voltage to (Vsupply+/−Vφ).

The charge pump's number of stages (N) depends only on the required charge pump (CP) output voltage (Vout). N can be an odd number (1,3,5 . . . ) or an even number (2,4,6 . . . ).

The topology described in FIG. 1A is a simple and commonly used charge pump topology, and is useful for explaining how to measure and adjust its current consumption. As will be understood by one having skill in the art, a technique of an embodiment of the disclosures described herein may be partially or fully applicable to all charge pump topologies.

FIG. 1B is a timing diagram showing switching (control) signals A and B, and switching (control) signals φ1 and φ2 for Stage 1 and Stage 2, respectively, as may be supplied by a conventional control circuit (Conventional Control Circuit).

Generally, Non-overlapped phases are used to protect back current from a next stage (such as Stage 2) to a previous stage (such as Stage 1). For example, that the signal A goes from low to high only after the signal B goes from high to low. No overlapping of timing signals means no contention between the stages. Generally, the charge pump pipe of FIG. 1A only has two phases, φ1 and φ2, but more phases can also be used.

In case where only two phases, φ1 and φ2 are used, typically, a next stage (Stage 3) would have the same phase as Stage 1. The next stage (Stage 4) would have the same phase as Stage 2, and so forth. The last stage (Stage N) has a phase of either φ1 or φ2, depending on whether N is an odd (3,4,7, 9 . . . ) or an even (4,6,8,10 . . . ) number.

The time relations of the switching (control) signals A, B, φ1 and φ2 depend on Charge Pump's stage topology, and for some kind of Charge Pump's stages topology, the control signals A, B, φ1 and φ2 can be overlapping.

As shown in FIG. 1A, each stage generally comprises a switch (S) and a capacitor (C). The switch is typically a solid state device, such as comprising a transistor. Stage 1 comprises a switch S1 and a capacitor C1. Switch S1 is controlled (turned off and on) by the switching (control) signal φ1. Stage 2 comprises a switch S2 and a capacitor C2. The switch S2 is controlled (switched on and off) by the switching (control) signal φ2. The switching (control) signals φ1 and φ2 are provided by a conventional control circuit (Conventional Control Circuit). The capacitors C1 and C2 (and CN) typically have the same value (as measured in farads).

As shown in FIG. 1A, each stage has a driver associated with it. Stage 1 has a driver (drv1), receiving a supply voltage Vφ1. The driver (drv1) is controlled (turned off and on) by a switching signal A which is provided by the conventional control circuit. Stage 2 has a driver (drv2), receiving a supply voltage Vφ2, which may or may not be equal to Vφ1. The driver (drv2) is controlled (turned off and on) by a switching signal B which is provided by the conventional control circuit. In some CP topologies, if stages receive the same control signal and supply voltage (e.g. A and Vφ1), they can share the same driver.

For purposes of this discussion, it is assumed (for descriptive clarity) that each of the stages are essentially identical to one another, and that all of the drivers (drv1, drv2 . . . drvN) are the same as one another, and that the current (I2) into each of the drivers is the same for each stage, as would be customary.

Generally speaking, the charge pump circuit (pipe) will be connected to a load (not shown), supplying an output current (Iout) at a voltage (Vout). The load may be an array of Flash memory cells, and it may be desired to operate (such as program or erase) several Flash memory cells at a time.

The charge pump's current consumption (Icp_in) can be expressed as:

$$Icp\_in = I_1 + N*I_2 \quad (4)$$

Input current ($I_1$) propagates through the charge pump's pipe to the output where $$Iout = I_1 \quad (5)$$

Generally, when the first phase φ1 is active, the first capacitor C1 is charged by the input current $I_1$ and accumulates a charge Q. Then during the second phase φ2 activity, the same charge Q is transferred to the next capacitor C2 through the switch S2, and so on through the stages of the charge pump.

If the charge pump's efficiency is 100% (η=1) the current of the phase driver branch, $I_2$, is equal to $I_1$.

$$I_2 = I_1 \quad (6)$$

The current $I_2$ is related to $I_1$. In a common case, the current $I_2 = I_1 + I\_parasitic$, where I_parasitic is parasitic current of the capacitor and driver.

But for a more realistic case:

$$I2 = \mu * I1, \quad (7)$$

where μ (>=1) is a current inefficiency coefficient;

For simplifying the current measurement method of the present disclosure, the charge pump current consumption (Icp_in) can be calculated as:

$$Icp\_in = I_2*(N+1), \text{ with implemented error } \epsilon = (I_2 - I_1) \quad (8)$$

The above equation (8) means that in order to measure the charge pump's current consumption it is necessary to measure first the current of the charge pump's phase (I2), and then to multiply it by (N+1).

Based on equation (5), the charge pump's output current (Iout) can be measured by measuring the input current (I1) of the charge pump's pipe. (Typically the charge pump's output current (Iout) would be measured from the output, but according to a technique of an embodiment of this disclosure, Iout can be measured from the input as well.)

Generally, a purpose of a technique of an embodiment of the disclosures disclosed herein is to measure current consumption, and the example of a simple charge pump (CP) having stages each comprising one switch (transistor) and one capacitor is given. In order to implement a technique of an embodiment of the disclosure, input current $I_1$ to the pipeline is measured, using a suitable device such as (but not limited to) a resistor R1, and input current to the drivers is measured by a suitable device such as (but not limited to) a resistor R2. The resistors R1 and R2 are exemplary of "resistive paths" which are commonly used to measure current.

FIG. 2A illustrates a charge pump current measurement circuit, comprising a charge pump (CP) pipe each of N stages of the charge pump pipe comprising a switch (S) and a capacitor (C), each stage comprising its own driver (drv). The switches (S) receive timing (control) signals φ1 and φ2 from a control circuit (Control Circuit) and the driver (drv) receives timing (control) signals A and B from the control circuit (Control Circuit), as described hereinabove. The charge pump pipe has an input Vsupply supplying a current $I_1$, and has an output providing Vout, Iout, in a manner similar to that of the charge pump pipe of FIG. 1A. The differences between the charge pump circuit of FIG. 2A and that of FIG. 1A will now be described.

In the charge pump pipe itself, means are provided for measuring input current $I_1$, and said means may simply be a resistor R1 which will develop a measurable voltage drop, related to the resistance (in ohms) of the resistor R1, indicative of the current flowing through the resistor R1. Other means for measuring the input current may be employed, such as a transistor operating as a resistor, and circuits (passive and/or active) emulating a resistor. A voltage (Vmeas1) indicative of the input current $I_1$ is provided to a selector (MUX), which is external to the charge pump pipe itself.

In a similar manner, means are provided for measuring driver current $I_2$, and said means may simply be a resistor R2 which will develop a measurable voltage drop, related to the resistance (in ohms) of the resistor R2, indicative of the current flowing into the driver drv2. Other means for measuring the driver current may be employed, such as a transistor operating as a resistor, and circuits (passive and/or active) emulating a resistor. A voltage (Vmeas2) indicative of the current $I_2$ is provided to the selector (MUX).

Reference voltage sources are provided and manipulated, external to the charge pump pipe itself. These include Vsupply (the same Vsupply which is supplying the charge pump pipe, and Vφ1 (the same voltage which is supplying the driver drv1).

The reference voltage Vsupply is provided through a resistor Rref1 and a current source Iref1, to provide a reference voltage Vref1. The driver supply voltage Vφ1 is provided through a resistor Rref2 and a current source Iref2, to provide a reference voltage Vref2.

At one of its inputs, the selector (MUX) receives the two measured voltages Vmeas1 and Vmeas2, and the selector (MUX) can output one of these measured voltages (Vmeas) to a first (−) input of a comparator (COMP).

At another of its inputs, the multiplexer (MUX) receives the two reference voltages Vref1 and Vref2, and the multiplexer (MUX) can output one of these reference voltages (Vref) to a second (+) input of a comparator (COMP).

Generally, the use of a selector (MUX) is simply a means to utilize one comparator, but if several comparators are used, then the use of the selector (MUX) may not be necessary. The selector (MUX) may be considered to be a multiplexer, partitioned as shown, so that any of the measured voltages (Vmeas1, Vmeas2) may be compared with any of the reference voltages (Vref1, Vref2).

The comparator (COMP) compares Vmeas with Vref, and provides output signal Vres to the control circuit (Control Circuit). The comparator output Vres="1" if the charge pump current consumption (Icp_in) is too high. Otherwise, the comparator output Vres="0".

FIG. 2B illustrates the operation (behavior) of the Control Circuit (control loop) of FIG. 2A.

In a first step 222, Vmeas and Vref are compared (by the comparator COMP, as described above).

In a next step 224, it is determined whether Vres="1" and, if not (NO), no changes to the operation of the charge pump pipe 228 or the charge pump's load 230 are made.

If Vres=1, this indicates that charge pump current consumption (Icp_in) is too high, and the following procedures 226 may be implemented, by the control circuit.

Charge pump current consumption (Icp_in) may be decreased by controlling (adjusting, typically decreasing, limiting) one or more parameters, such as (but not limited to):

a. Vsupply (the supply voltage)
b. Vφ (the phase's voltage)
c. the phase's (stage's) frequency and/or duty-cycle (this should be changed in FIG. 2B as well)
d. the number (N) of stages (if many stages, some can be "eliminated" by shorting)
e. adjusting the charge pump's (CP's) load.

The first four items (a-d) relate to controlling the operation of the charge pump pipe, itself. The last item (e) relates to controlling the load which is being driven by the charge pump pipe. Generally, only one (control the CP) or the other (control the load) will be controlled, but controlling both is also possible, and is within the scope of this disclosure.

Regarding controlling the load, it has been discussed hereinabove that the load may be NVM memory cells, such as NROM cells, in a mode of operation (such as program or erase) which require overvoltages supplied by the charge pump. Such a load may be adjusted by programming fewer memory cells in parallel, for example, 4 cells instead of 8, to match the capability of the charge pump. (Basically, increasing load of the charge pump improves its efficiency, but if charge pumps exceeds current consumption, limited by specification, there is no other way as to decrease the charge pump's load, for example, so efficiency may be sacrificed.)

"How It Works"

In FIG. 2A, the input current of the CP's pipe ($I_1$) can be measured as the voltage drop on the resistor R1 (or other means for measuring voltage, as described above), according to the following equation.

$$Vmeas1 = I_1 * R1 \quad (9)$$

The current of the CP's phase driver ($I_2$) can be measured as the voltage drop on the resistor R2, according to the following equation.

$$Vmeas2 = I_2 * R2; \quad (10)$$

Means for measuring current, such as a resistor R2 can be placed on (current can be measured for, by generating a voltage drop across R2) each of the phase driver's branches, but can also be located only on each and every one of them, and/or on some of the phase drivers. (Typically, all of the phase drivers will be the same, and in FIG. 2A, there is shown a dedicated driver for each stage. Of course, there is an option to supply all odd stages by the driver drv1, and all even stages by the driver drv2, for example. In such a case, measured current I2 can be presented as product of current per one stage and number of supplied stages.)

This provides a number of measured voltages Vmeas1 and Vmeas2 for the phase drivers. (If all stages are identical, it doesn't matter which driver's current (I2) is measured. However, the disclosure is not limited to measuring only one current, because it is possible to measure all of the currents from all of the phase drivers and "average" them in one way or another.)

A number of reference voltages Vref1 and Vref2 are provided (generated), as follows (see lower left quadrant of FIG. 2A):

Vsupply, to ground, through a resistive path Rref1 and a constant current source (Iref1), to provide Vref1.

Vφ1, to ground, through a resistive path Rref2 and constant current source (Iref2), to provide Vref2.

Reference voltages can readily be calculated as follows:

$$Vref1 = Iref1 * Rref1 \text{ and } Vref2 = Iref2 * Rref2 \quad (11)$$

Recall that Vmeas1 and Vmeas2 were measured as voltage drop on the resistors R1 and R2 respectively.

The two reference voltages Vref1 and Vref2 are connected to inputs of a multiplexer, or "selector" (MUX), functioning as a switch or selector, which will output only one of the references voltages, as Vref to a positive (+) input of a comparator (COMP). The two measured voltages (Vmeas1 and Vmeas2) are similarly connected to inputs of the multiplexer (MUX) which will output only one of the measured voltages, as Vmeas, to a negative (−) input of the comparator (COMP).

The comparator (COMP) will compare Vref and Vmeas, and output a simple logic signal Vres, which will be at one of two binary levels (such as "1" or "0").

Until the currents through the resistors R1 and R2 do not exceed a certain level, measured voltages Vmeas1, Vmeas2 are higher than the reference voltages Vref1, Vref2 and the comparator (Comp) generates an output logic signal Vres="0".

Increasing the currents through resistors R1, R2 causes the voltage drops (E=IR) through these resistors to increase, and therefore the measured voltages Vmeas1, Vmeas2 to decrease. The output of the comparator (COMP) flips the state to Vres="1", if the measured voltages Vmeas1, Vmeas2 are lower than Vref1, Vref2 levels, respectively.

In order to measure the charge pump's output current (Iout), the first measured voltage Vmeas1, through voltage selector (MUX), is applied to the corresponding input of the comparator (COMP), as shown. The output of the comparator, Vres, is applied to a control circuit (Control Circuit), which controls some parameters of the Charge Pump and/or it's load, so that regulation is achieved. Thus, the charge pump's output current (Iout) can be calculated as:

$$Iout = I_1 = Iref1 * Rref1/R1 \quad (12)$$

Equation (12) is appropriate for the resistor-based current-measuring embodiment shown in the schematic of FIG. 2A. Using other current-measuring means, the concept remains the same—the measured current should be compared with some reference current. Usually, the charge pump's measured current may be in the range of a tenth of a milliamp and the reference current is in the range of a tenth of a microampere. The Rref/R ratio simply reflects the ratio between measured and reference currents. (See also equation (13), below.)

As noted above, the parameters of the CP that may be controlled include:
a. Vsupply (the supply voltage)
b. Vφ (the phase's voltage)
c. the phase's frequency and/or duty-cycle
d. the number (N) of stages (if many stages, some can be "eliminated" by shorting)
e. adjusting the CP's load.

In order to measure the CP current consumption (Icp_in) from the supply (Vsupply), Icp_in, the second measured voltage Vmeas2, through voltage selector (MUX), is applied to the corresponding (−) input of the comparator (COMP). The output of the comparator, Vres, is applied to the control circuit (Control Circuit), which controls some parameters of the Charge Pump and/or it's load, so that regulation is achieved. Thus, the CP's current consumption (Icp_in) can be calculated as:

$$Icp\_in = (N+1)Iref2 * Rref2/R2, \text{ with error } \epsilon = (I_2 - I_1) \quad (13)$$

For practical purposes, this implemented error (ε) does not have significant impact on the current measurement result (for example, less than five percent, <5%).

If, for some application, the charge pump's current consumption (Icp_in) needs to be measured more accurately, there are several different ways to do so. As an example, it is possible to measure the input current of the charge pump's pipe ($I_1$), and then, using it for error correction of the measurement of Icp_in.

For example, the accurate value of the CP current consumption can be calculated from equation (4):

$$Icp\_in = I_1 + N * I_2;$$

If, $I_1 = Iref1 * Rref1/R1$ and $I_2 = Iref2 * Rref2/R2$,

Then, Icp_in = Iref1*Rref1/R1 + N*Iref2*Rref2/R2;

The first part of this equation can be obtained by measuring the input current $I_1$, and the second part by measuring the driver's current $I_2$.

A technique of an embodiment of the disclosures described herein for measuring the current consumption of a charge pump and the output current of a charge pump may open new possibilities of improving Flash memory performance by adjusting (increasing) the load of the charge pump on the one hand, while not exceeding limits for average and peak currents on the other hand.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations.

What is claimed is:

1. A method of operating a non-volatile memory device comprising:
regulating a charge pump having one or more stages based on measuring current consumption (Icp_in) and output current (load current, Icp_out) of the charge pump (CP), wherein measuring includes:
measuring a first current (I.sub.1) coming into the charge pump; and
measuring a second current (I.sub.2) coming into a driver for at least one of the one or more stages of the charge pump.

2. The method of claim 1, further comprising: controlling current consumption and/or output current of the charge pump using a control loop affecting one or more parameters of the charge pump and/or a load connected to the charge pump.

3. The method of claim 1, further comprising:
decreasing the current consumption (Icp_in) by adjusting one or more of:
a. a supply voltage (Vsupply);
b. a stage's voltage (V.phi.);
c. the stage's frequency and/or duty-cycle; and
d. the number (N) of stages.

4. The method of claim 1, further comprising:
decreasing the current consumption (Icp_in) by adjusting a load connected to the output of the charge pump pipe.

5. The method of claim 1, further comprising:
measuring the first current using a resistive path.

6. The method of claim 1, further comprising:
comparing the first current to a first reference current.

7. The method of claim 5, further comprising:
measuring the second current using a resistive path.

8. The method of claim 7, further comprising:
comparing the second current to a second reference current.

9. The method of claim 8, further comprising:
comparing the first current to a first reference current.

10. The method of claim 1, further comprising:
providing a first measured voltage (Vmeas1) indicative of the first current ($I_1$);
providing a second measured voltage (Vmeas2) indicative of the second current ($I_2$);
providing a first supply voltage (Vsupply) to an input of the charge pump;
providing a second supply voltage (V.phi.1) to a driver of the charge pump;
providing a first reference voltage (Vref1) based on the first supply voltage (Vsupply);
providing a second reference voltage (Vref2) based on the second supply voltage (V.phi.1); and
selectively comparing the measured voltages to the reference voltages to control operation of the charge pump.

11. The method of claim 1, further comprising:
wherein a load connected to the charge pump comprises non-volatile memory cells.

12. The method of claim 11, further comprising:
implementing the charge pump on a same integrated circuit (IC) chip as the memory cells.

13. A method of controlling operation of a charge pump (CP) pipe having an input receiving a supply voltage (Vsupply), a number of stages, and an output (Vout, Iout), comprising:
regulating the charge pump based on measuring current consumption (Icp_in) in the charge pump pipe and measuring a second current ($I_2$) coming into a driver for at least one of the one or more stages of the charge pump; and
decreasing the current consumption (Icp_in) by adjusting one or more of:
a. a supply voltage (Vsupply);
b. a stage's voltage (V.phi.);
c. the stage's frequency and/or duty-cycle;
d. the number (N) of stages; and
e. adjusting a load connected to the output of the charge pump pipe.

14. A Non-Volatile Memory apparatus comprising: a control circuit for controlling operation of a charge pump (CP) pipe having an input receiving a supply voltage (Vsupply), a number of stages, and an output (Vout, Iout), said control circuit including means for measuring current consumption (Icp_in) in the charge pump pipe, and means for measuring a second current ($I_2$) coming into a driver for at least one of the one or more stages of the charge pump, and
means for decreasing or increasing the current consumption (Icp_in) by adjusting one or more of:
a. a supply voltage (Vsupply);
b. a stage's voltage (V.phi.);
c. the stage's frequency and/or duty-cycle;
d. the number (N) of stages; and
e. adjusting a load connected to the output of the charge pump pipe.

15. The apparatus of claim 14, wherein:
each stage comprises a switch (S) and a capacitor (C).

16. The apparatus of claim 14, wherein:
the means for measuring current consumption (Icp_in) comprises:
means for measuring a first current ($I_1$) coming into the charge pump; and
means for measuring a second current ($I_2$) coming into a driver (drv1) for a given stage of the charge pump.

17. A non-volatile memory apparatus comprising:
A control circuit for a charge pump (CP) pipe having an input receiving a supply voltage (Vsupply), a number (N) of stages, each stage having a driver (drv), and an output (Vout, Iout), said control circuit comprising:
means for measuring a first current ($I_1$) coming into the charge pump; and
means measuring a second current ($I_2$) coming into a driver for at least one of the one or more stages of the charge pump.

18. The apparatus of claim 17, further comprising:
means for controlling the current consumption and/or output current of the charge pump using a control loop affecting one or more parameters of the charge pump and/or a load connected to the charge pump.

19. The apparatus of claim 17, further comprising:
means for comparing the first current to a first reference current; and
means for comparing the second current to a second reference current.

20. The apparatus of claim 17, further comprising:
means for controlling the current consumption by adjusting one or more of:
a. a supply voltage (Vsupply);
b. a stage's voltage (V.phi.);
c. the stage's frequency and/or duty-cycle; and
d. the number (N) of stages; and
e. a load connected to the output of the charge pump pipe.

* * * * *